(12) United States Patent  
Namba et al.

(10) Patent No.: US 7,834,308 B2  
(45) Date of Patent: Nov. 16, 2010

(54) IMAGING APPARATUS HAVING ELECTRON SOURCE ARRAY THAT EMITS ELECTRONS DURING A BLANKING PERIOD

(75) Inventors: Masakazu Namba, Tokyo (JP); Yuki Honda, Tokyo (JP); Yoshiyuki Hirano, Tokyo (JP); Saburo Okazaki, Tokyo (JP); Norifumi Egami, Tokyo (JP); Toshihisa Watabe, Tokyo (JP); Yoshiro Takiguchi, Tokyo (JP); Akira Kobayashi, Hamamatsu (JP); Shigeo Itoh, Mobara (JP); Masateru Taniguchi, Mobara (JP); Kazuhito Nakamura, Mobara (JP); Kenta Miya, Mobara (JP); Yoshiyuki Okuda, Tsurugashima (JP); Nobuyasu Negishi, Tsurugashima (JP)

(73) Assignees: Nippon Hoso Kyokai, Tokyo (JP); Hamamatsu Photonics K.K., Hamamatsu-Shi (JP); Futaba Corporation, Mobara-Shi (JP); Pioneer Corporation, Tokyo (JP)

( * ) Notice: Subject to any disclaimer, the term of this patent is extended or adjusted under 35 U.S.C. 154(b) by 8 days.

(21) Appl. No.: 12/123,719

(22) Filed: May 20, 2008

(65) Prior Publication Data

US 2008/0290254 A1 Nov. 27, 2008

(30) Foreign Application Priority Data

May 21, 2007 (JP) .............................. 2007-134789

(51) Int. Cl.  
*H01L 31/00* (2006.01)  
*G09G 3/20* (2006.01)

(52) U.S. Cl. ................................... 250/214.1; 345/75.2

(58) Field of Classification Search ............... 250/208.1, 250/214.1; 315/169.2; 345/74.1, 75.2  
See application file for complete search history.

(56) References Cited

U.S. PATENT DOCUMENTS 5,488,386 A 1/1996 Yamagishi et al.  
2006/0284683 A1* 12/2006 Ishii .......................... 330/295

FOREIGN PATENT DOCUMENTS

JP 6-176704 6/1994  
JP 2004-134144 4/2004

OTHER PUBLICATIONS

U.S. Appl. No. 12/123,707, filed May 20, 2008, Honda, et al.  
U.S. Appl. No. 12/123,987, filed May 20, 2008, Honda et al.

* cited by examiner

*Primary Examiner*—Thanh X Luu  
(74) *Attorney, Agent, or Firm*—Oblon, Spivak, McClelland, Maier & Neustadt, L.L.P.

(57) ABSTRACT

An imaging apparatus includes an electron emission array having electron sources arranged in matrix form and having a plurality of horizontal scan lines, a photoelectric conversion film opposed to the electron emission array, and a control and drive circuit configured to select one or more of the horizontal scan lines in a given video signal output period and to cause the electron sources included in the selected one or more horizontal scan lines to emit electrons toward the photoelectric conversion film to produce a video signal, wherein the control and drive circuit is configured to cause the electron sources included in unselected one or more horizontal scan lines not selected in the given video signal output period to emit electrons toward the photoelectric conversion film in a blanking period immediately preceding the given video signal output period.

14 Claims, 35 Drawing Sheets

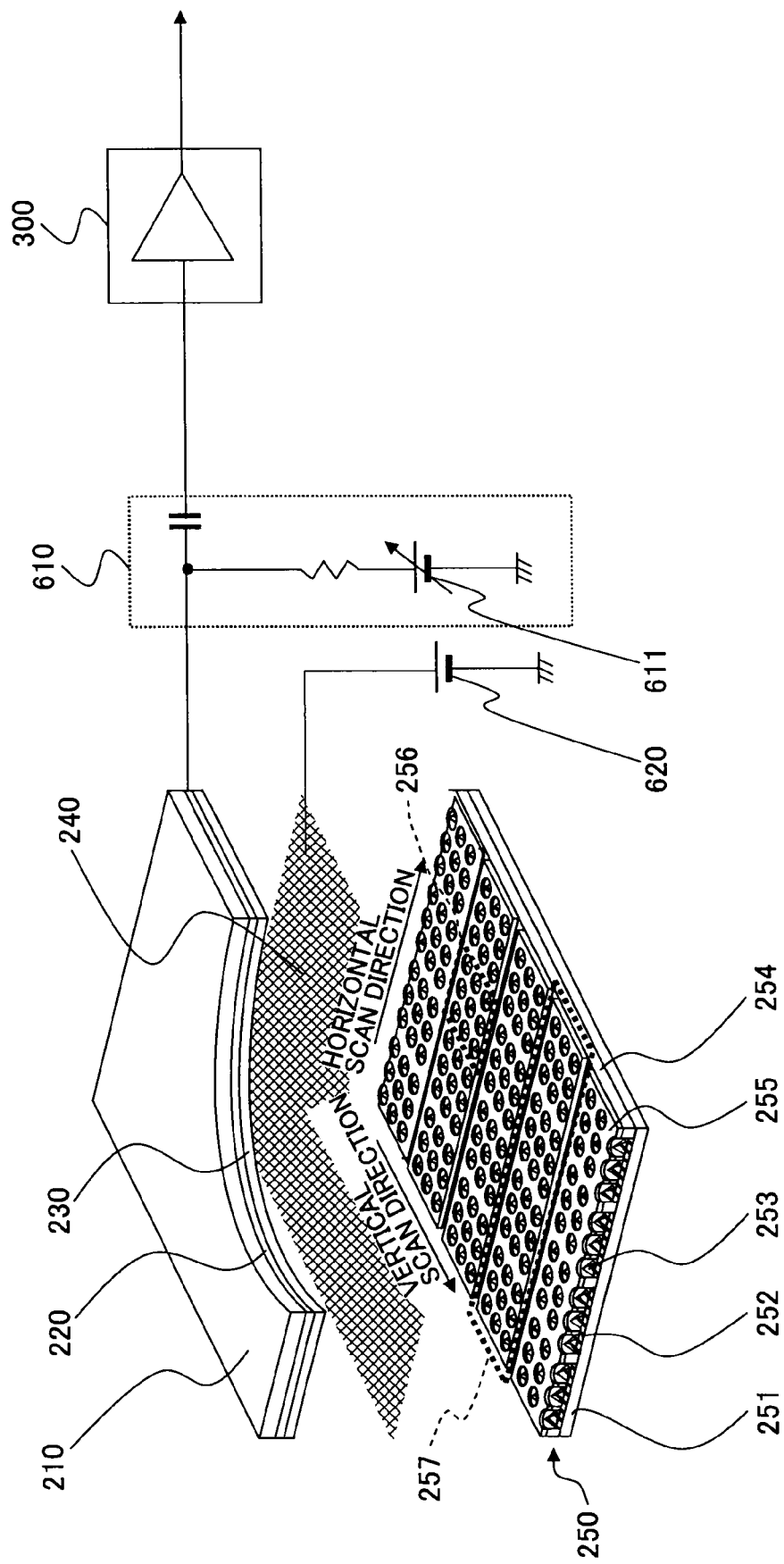

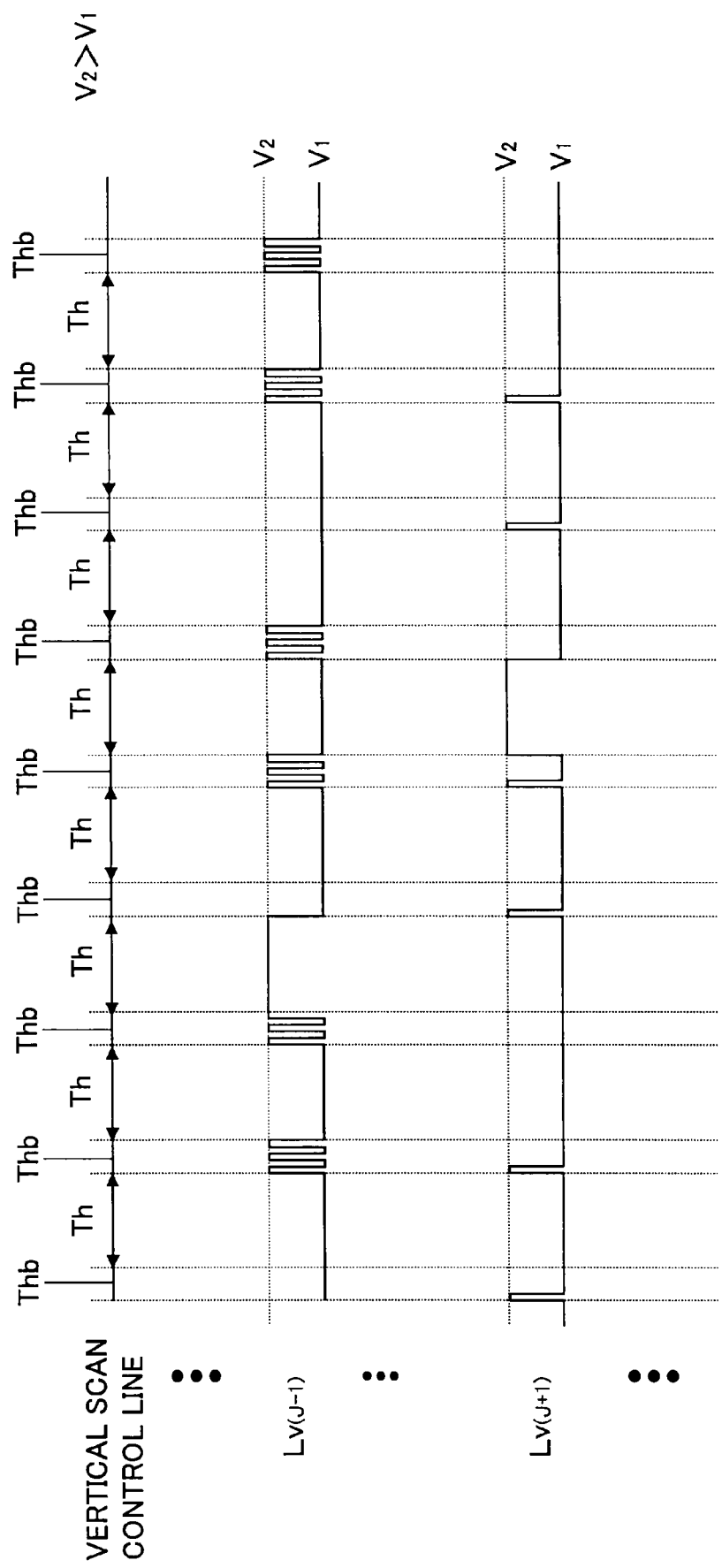

IMAGING APPARATUS HAVING ELECTRON SOURCE ARRAY THAT EMITS ELECTRONS DURING A BLANKING PERIOD

BACKGROUND OF THE INVENTION

1. Field of the Invention

The disclosures herein relate to an imaging apparatus provided with a photoelectric conversion film and an electron source array having electron sources arranged in matrix form wherein electrons are emitted from the electron source array during a video signal output period and a vertical blanking period.

2. Description of the Related Art

Research has been conducted for some time with respect to imaging apparatus that is provided with a photoelectric conversion film and an electron emission array having a matrix of electron emission sources, from which electrons are drawn out by an electric field without application of heat. This electron emission array has a plurality of Spindt-type emitters arranged in matrix form, which are opposed to the photoelectric conversion film across vacuum space. In such imaging device, holes that are generated and accumulated in the photoelectric conversion film in response to light arriving from an external source are read out by using electrons successively emitted from the Spindt-type emitter array, thereby producing a time sequence of video signals (see Patent Document 1).

When highly bright light enters a portion of the photoelectric conversion film of such an imaging apparatus, a large amount of holes will be accumulated in this portion of the photoelectric conversion film on its electron scan side, resulting in a potential increase at this local position. As electrons are successively emitted from the electron emission array, those electrons emitted toward the vicinity of the portion of the photoelectric conversion film that is illuminated by highly bright light have their trajectory bent towards this portion of the photoelectric conversion film having an extremely high potential. This phenomenon will hereinafter be referred to as "bending". As a result of the bending, holes accumulated in this portion of the photoelectric conversion film will be read out. Consequently, the output video image suffers an artifact by which a highly bright object appears expanded from its original size (which will hereinafter be referred to as "blooming"), degrading image quality such as image resolution.

Further, when highly bright light enters a portion of the photoelectric conversion film, a large amount of holes are generated and accumulated in this portion. When this happens, it may not be possible to read out all the generated and accumulated holes by use of the electrons emitted from the electron emission array on a single scan, thereby creating a prominent capacitive residual image.

Moreover, the entry of highly bright light into the photoelectric conversion film causes a large amount of holes to be accumulated on the electron scan side of the photoelectric conversion film. This serves to drop the effective electric field applied to the photoelectric conversion film, resulting in a large amount of optically generated electric charge (electrons and holes) being trapped in the photoelectric conversion film. As the electric field in the photoelectric conversion film increases in response to scanning on the photoelectric conversion film by electrons successively emitted from the electron emission array, the optically generated electric charge is released from its trapped state. Holes of this freed electric charge are then accumulated on the electron scan side of the photoelectric conversion film. As a result, these holes that were trapped are read out on a next scan, creating a prominent photoconductive residual image.

In order to obviate these problems, study has been conducted with respect to a flat-type imaging device that emits electrons in an excessively-accumulated charge sweeping period. This excessively-accumulated charge sweeping period is situated following a video signal output period, during which pixel signals on a horizontal scan line is read out (see Patent Document 2, for example).

This flat-type imaging device applies a voltage to the gate electrode of a next horizontal scan line in an excessively-accumulated charge sweeping period, and sets the potential of cathode electrodes higher than the potential of a reference scan surface. This serves to remove the accumulated electric charge that is provided in excess of the amount readable within the video signal output period. With this arrangement, white saturation, smear, and resolution degradation resulting from imaging a highly bright object are prevented.

In order to prevent white saturation, smear, and resolution degradation resulting from imaging a highly bright object, Patent Document 2 discloses applying a voltage to the gate electrode of a next following horizontal scan line and also setting the potential of cathode electrodes higher than the potential of a reference scan surface in an excessively-accumulated charge sweeping period following a video signal output period. The disclosed flat-type imaging device can thus remove the electric charge that is accumulated in excess of the amount readable during a video signal scan period.

In the imaging device disclosed in Patent Document 2, however, the amount of electrons used to remove excessively accumulated electric charge is limited to the amount of electrons that are emitted during a single excessively-accumulated charge sweeping period within one field or one frame. The effect of electric charge removal thus may not be sufficient depending on imaging conditions. Especially when highly bright light such as that of a street lamp or the headlights of a car enters a photoelectric conversion film during filming at night while the diaphragm of the optical lens is open, the amount of holes generated and accumulated in the photoelectric conversion film may be hundreds to thousands times greater than the amount of holes obtained under normal circumstances. It is thus not possible to remove all the excessive holes generated and accumulated in the photoelectric conversion film within a single excessively-accumulated charge sweeping period. In this case, image degradation is unavoidable due to the lowering of image resolution resulting from blooming and also due to the generation of capacitive residual images.

In the imaging device disclosed in Patent Document 2, also, the excessive holes accumulated in the photoelectric conversion film on the horizontal scan line (first horizontal scan line) from which a video signal will next be output is removed during an excessively-accumulated charge sweeping period. There may be a case in which a large amount of holes are accumulated on the next horizontal scan line (second horizontal scan line adjacent to the first scan line) from which a video signal will be output next following the first horizontal scan line. In such a case, the electrons successively output from the first horizontal scan line of the electron emission array to detect a video signal is bent towards the position of the second horizontal scan line of the photoelectric conversion film having a higher potential, thereby ending up reading holes accumulated there. This gives rise to a problem that blooming is generated, and image resolution is degraded.

Further, the imaging device disclosed in Patent Document 2 cannot prevent the generation of a photoconductive residual image resulting from the lowering of an electric field within the photoelectric conversion film in response to highly bright incident light. Especially when a highly bright object is in motion, the object leaves a visible trace on the screen. This causes a severe reduction in image quality.

Accordingly, there is a need for an imaging apparatus that can prevent the degradation of image resolution resulting from blooming occurring due to highly bright incident light, and can also prevent the generation of capacitive or photo-conductive residual images.

[Patent Document 1] Japanese Patent Application Publication No. 6-176704

[Patent Document 2] Japanese Patent Application Publication No. 2004-134144

SUMMARY OF THE INVENTION

It is a general object of the present invention to provide an imaging apparatus that substantially obviates one or more problems caused by the limitations and disadvantages of the related art.

An imaging apparatus of at least one embodiment includes an electron emission array having electron sources arranged in matrix form and having a plurality of horizontal scan lines, a photoelectric conversion film opposed to the electron emission array, and a control and drive circuit configured to select one or more of the horizontal scan lines in a given video signal output period and to cause the electron sources included in the selected one or more horizontal scan lines to emit electrons toward the photoelectric conversion film to produce a video signal, wherein the control and drive circuit is configured to cause the electron sources included in unselected one or more horizontal scan lines not selected in the given video signal output period to emit electrons toward the photoelectric conversion film in a blanking period immediately preceding the given video signal output period.

Further, the control and drive circuit may be configured to cause the electron sources included in the selected one or more horizontal scan lines selected in the given video signal output period to emit electrons toward the photoelectric conversion film in the blanking period immediately preceding the given video signal output period.

Moreover, the control and drive circuit may be further configured to cause the electron sources included in the selected one or more horizontal scan lines to emit electrons toward the photoelectric conversion film in a plurality of blanking periods situated between the given video signal output period and a next video signal output period in which the one or more horizontal scan lines will be selected next time.

Also, the control and drive circuit may be further configured to cause the electron sources included in the selected one or more horizontal scan lines to emit electrons toward the photoelectric conversion film in each or some of a plurality of blanking periods situated between the given video signal output period and a next video signal output period in which the one or more horizontal scan lines will be selected next time, said some of the plurality of blanking periods being blanking periods spaced apart by one or more intervening, consecutive blanking periods.

Further, two or more blanking periods during which electrons are emitted from the electron sources included in the selected one or more horizontal scan lines selected in the given video signal output period may be identical to two or more blanking periods during which electrons are emitted from the electron sources included in one or more horizontal scan lines selected in another video signal output period.

Alternatively, at least one blanking period during which electrons are emitted from the electron sources included in the selected one or more horizontal scan lines selected in the given video signal output period may differ from any blanking period during which electrons are emitted from the electron sources included in one or more horizontal scan lines selected in another video signal output period.

Moreover, the electron emission array may include a first electrode for emitting electrons and a second electrode for creating a potential gap with the first electrode, and a potential gap is created between the first electrode and the second electrode to draw out electrons from the first electrode.

In this case, further, a potential gap created between the first electrode and the second electrode in the blanking period may be set larger than a potential gap created between the first electrode and the second electrode in the given video signal output period.

Moreover, at least one of the first electrode and the second electrode may receive a first voltage in the blanking period, and may receive a second voltage different from the first voltage in the given video signal output period.

Also, the photoelectric conversion film may receive a first voltage in the blanking period, and may receive a second voltage different from the first voltage in the given video signal output period.

A signal level detecting unit configured to detect a signal level of a video signal output from a horizontal scan line in a video signal output period may further be provided, wherein either a horizontal scan line including the electron sources to emit electrons towards the photoelectric conversion film in a given blanking period or the electron sources included in a horizontal scan line to emit electrons towards the photoelectric conversion film in a given blanking period is selected in response to the signal level of the video signal detected by the signal level detecting unit.

A signal level detecting unit configured to detect a signal level of a video signal output from a horizontal scan line in a video signal output period may further be provided, wherein a number of blanking periods during which the electron sources included in a given horizontal scan line emit electrons towards the photoelectric conversion film varies depending on the signal level of the video signal detected by the signal level detecting unit.

A signal level detecting unit configured to detect a signal level of a video signal output from a horizontal scan line in a video signal output period may further be provided, wherein a time length during which electrons are emitted from the electron sources included in a given horizontal scan line toward the photoelectric conversion film in a given blanking period varies depending on the signal level of the video signal detected by the signal level detecting unit.

A signal level detecting unit configured to detect a signal level of a video signal output from a horizontal scan line in a video signal output period may further be provided, wherein a potential gap created between the first electrode and the second electrode in the electron sources included in a given horizontal scan line in a given blanking period varies depending on the signal level of the video signal detected by the signal level detecting unit.

According to at least one embodiment, the imaging apparatus can prevent the degradation of image resolution resulting from blooming occurring due to highly bright incident light, and can also prevent the generation of capacitive or photoconductive residual images. Satisfactory image quality is thus obtained.

BRIEF DESCRIPTION OF THE DRAWINGS

Other objects and further features of the present invention will be apparent from the following detailed description when read in conjunction with the accompanying drawings, in which:

FIGS. 2A and 2B are drawings showing the configuration of an imaging device included in the imaging apparatus of the first embodiment, wherein FIG. 2A is a partial-cross-sectional perspective view showing the schematic configuration of the imaging device, and FIG. 2B is a cross-sectional view showing a portion of the imaging device in an enlarged view;

FIG. 30 is a drawing showing the amplitude and timing of other pulse voltages applied to the vertical scan control lines Lv of the imaging apparatus of the second embodiment;

DESCRIPTION OF THE PREFERRED EMBODIMENTS

In the following, embodiments to which an imaging apparatus of the present invention is applied will be described.

First Embodiment

Figure 1:
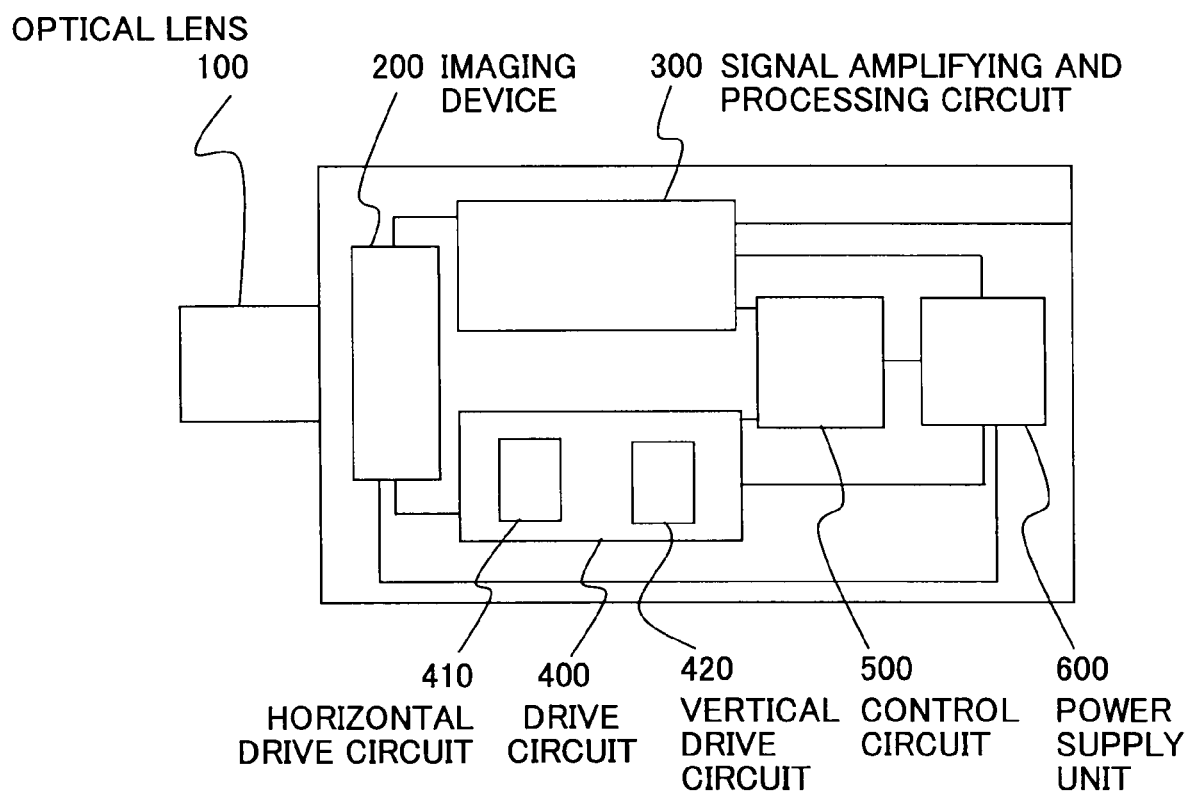
FIG. 1 is a schematic cross-sectional view of an imaging apparatus according to a first embodiment.

FIG. 1 is a schematic cross-sectional view of an imaging apparatus according to a first embodiment. The imaging apparatus of this embodiment includes an optical lens 100, an imaging device 200, a signal amplifying and processing circuit 300, a drive circuit 400, a control circuit 500, and a power supply unit 600.

The optical lens 100 and the imaging device 200 are arranged such that light passing through the optical lens 100 enters the photoelectric conversion film of the imaging device 200 perpendicularly to form a focus thereon.

The signal amplifying and processing circuit 300 amplifies and processes video signals output from the imaging device 200.

The drive circuit 400 includes a horizontal drive circuit 410, a vertical drive circuit 420, etc., and generates pulse voltages necessary to drive the imaging device 200.

The control circuit 500 generates a clock signal, synchronizing signals, and the like, and supplies these signals to the drive circuit 400 and the signal amplifying and processing circuit 300.

The power supply unit 600 supplies power to the imaging device 200, the signal amplifying and processing circuit 300, the drive circuit 400, and the control circuit 500.

Figure 2B:
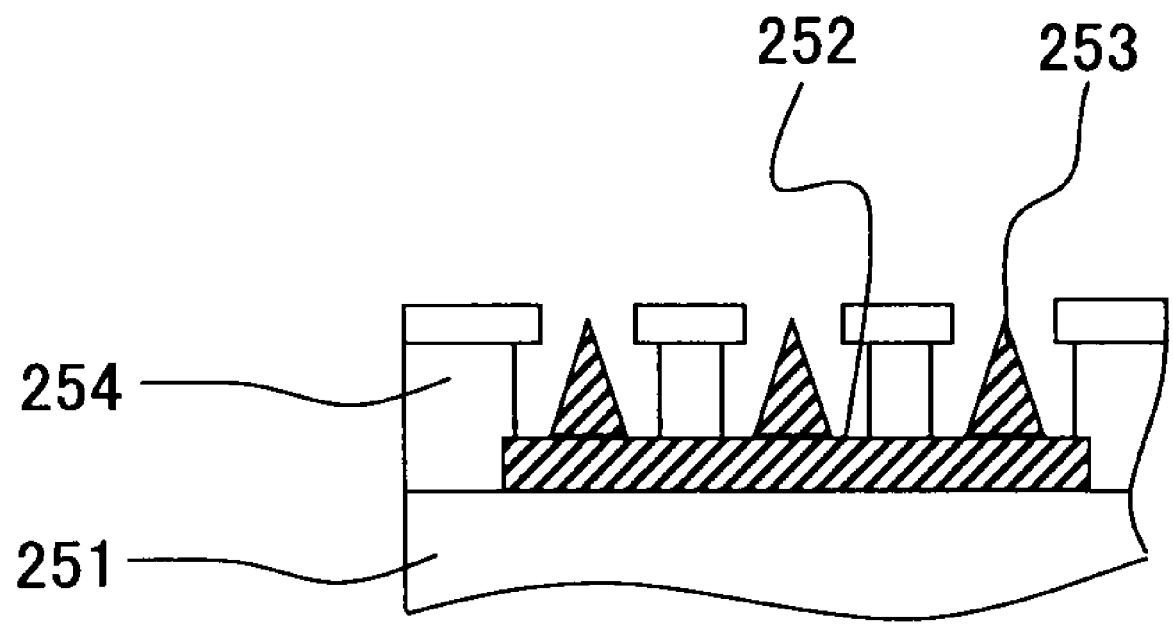

FIGS. 2A and 2B are drawings showing the configuration of the imaging device 200 included in the imaging apparatus of the first embodiment. FIG. 2A is a partial-cross-sectional perspective view showing the schematic configuration of the imaging device 200. FIG. 2B is a cross-sectional view showing a portion of the imaging device 200 in an enlarged view.

The imaging device 200 of this embodiment includes a translucent substrate 210, a translucent conductive film 220, a photoelectric conversion film 230, a mesh electrode 240, and a Spindt-type emitter array 250.

The translucent conductive film 220 is formed on the translucent substrate 210. The photoelectric conversion film 230 is formed on the translucent conductive film 220. The Spindt-type emitter array 250 is disposed to face the photoelectric conversion film 230 across vacuum space. The mesh electrode 240 having a plurality of openings is disposed between the photoelectric conversion film 230 and the electron emission array 250.

Although omitted in FIG. 2A for the sake of simplicity of illustration, the imaging device 200 for use in practice includes a mechanism for supporting the electron emission array 250, the photoelectric conversion film 230, and the mesh electrode 240 at predetermined intervals in an opposing manner. The imaging device 200 further includes electrodes for supplying a DC voltage and pulse voltages necessary to drive the imaging device 200. The imaging device 200 moreover includes a vacuum chamber for keeping vacuum space between the electron emission array 250 and the photoelectric conversion film 230.

The imaging device 200 may not be provided with the function to converge electrons emitted from the electron emission array 250 on the photoelectric conversion film 230. In such case, a magnetic field converging system inclusive of a permanent magnet or a solenoid coil may be provided outside the imaging device 200.

The translucent substrate 210 may be made of glass if the imaging device 200 is designed to detect visible light. The translucent substrate 210 maybe made of sapphire or silica glass if the imaging device 200 is designed to detect ultraviolet light. The translucent substrate 210 may be made of beryllium (Be), silicon (Si), aluminum (Al), titanium (Ti), boron nitride (BN), aluminum oxide ($Al_2O_3$), or the like if the translucent substrate 210 is designed to detect X rays. In this manner, proper material may be selected depending on the wavelength of light to be detected.

The translucent conductive film 220 may be configured as a tin oxide ($SnO_2$) film, an ITO film, or a thin metal film such as an aluminum (Al) film, for example. The translucent conductive film 220 is connected to an external circuit 610, which includes a power supply 611 to apply voltage. The external circuit 610 is implemented as part of the signal amplifying and processing circuit 300 and the power supply unit 600 shown in FIG. 1.

A material for forming the photoelectric conversion film 230 may be a semiconductor material such as selenium (Se), silicon (Si), or the like, or may be a compound semiconductor material such as lead oxide (PbO), antimony trisulfide (Sb2S3), cadmium selenide (CdSe), cadmium telluride (CdTe), gallium arsenide (GaAs), zinc telluride (ZnTe), or the like.

Among these materials, a semiconductor material such as selenium (Se) or silicon (Si) may be used to form an amorphous semiconductor film. Application of high voltage to such film causes avalanche amplification of optically generated electric charge in the film, thereby significantly improving sensitivity.

It suffices for the mesh electrode 240 to have a plurality of openings. The mesh electrode 240 may be made of a known metal material, alloy material, semiconductor material, or the like. The mesh electrode 240 is connected to a power supply 620. The mesh electrode 240 receives a voltage higher than the voltage applied to the gate electrodes of the electron emission array 250, which will later be described. The power supply 620 is implemented as part of the power supply unit 600 shown in FIG. 1.

The electron emission array 250 is implemented as a matrix array of known electron emission sources such as Spindt-type emitters having cathodes made of a high-melting-point metal, silicon-type emitters having cathodes made of silicon (Si), or electron field emission sources having porous silicon, silicon oxide, or the like placed between electrodes.

Further, there are a variety of methods for driving an electron emission array. The electron emission array 250 may be a passive electron emission array driven by pulse voltages supplied from an external drive circuit, a drive-circuit-embedded passive electron emission array having a drive circuit embedded therein, an active electron emission array having a transistor embedded in each unit area of the array, or a drive-circuit-embedded active electron emission array having a drive circuit embedded therein and also having a transistor embedded in each unit area of the array.

The present embodiment will be described with respect to a case in which a Spindt-type passive emitter array is used as the electron emission array 250. In the following, the term "electron emission array 250" is intended to refer to a Spindt-type passive emitter array 250 unless contrary indication is provided.

If the drive circuit 400 is embedded in the electron emission array 250, the drive circuit 400 shown in FIG. 1 is not used. In this case, the control circuit 500 directly supplies a clock signal and synchronizing signals to the imaging device 200. Further, the electric power necessary to drive the imaging device 200 is directly supplied from the power supply unit 600 to the imaging device 200.

As shown in FIG. 2A, the electron emission array 250 of the present embodiment includes a substrate 251, cathode electrodes 252, cathodes 253, an insulation layer 254, and gate electrodes 255.

The substrate 251 is made of glass, silicon (Si), quartz, ceramics, resin, or the like. The cathode electrodes 252, the insulation layer 254, and the gate electrodes 255 are disposed on the substrate 251 in the order listed.

The cathode electrodes 252 are stripe-shape electrodes having a longitudinal direction thereof extending parallel to the vertical scan direction shown in FIG. 2A. The gate electrodes 255 are stripe-shape electrodes having a longitudinal direction thereof extending parallel to the horizontal scan direction shown in FIG. 2A. In this manner, the cathode electrodes 252 and the gate electrodes 255 extend perpendicularly to each other to form an X-Y matrix An intersecting area defined by a cathode electrode 252 and a gate electrode 255 intersecting with each other is referred to as "unit area", which will be referred to by reference number "256". A plurality of unit areas 256 included in the stripe-shape area of a given gate electrode 255 are arranged in the horizontal scan direction to form a line that is referred to as a horizontal scan line 257.

In each unit area 256, small holes extend through the gate electrode 255 and the insulation layer 254 to reach the surface of the cathode electrode 252 as shown in FIG. 2B. The cathodes 253 are disposed in these holes to project from the cathode electrodes 252.

The cathodes 253 are made of a high-melting-point metal material such as molybdenum (Mo), niobium (Nb), tungsten (W), or the like. In typical configuration, a plurality of small holes are provided in each unit area 256, and each hole has a single cathode 253 provided therein. FIG. 2A shows a configuration in which 9 small holes are formed in each unit area 256 so that 9 cathodes 253 are provided.

These 9 cathodes 253 constitute a minimum unit of electron emission control provided in each unit area 256, and are referred to as an "element".

The cathode electrodes 252 receive pulse voltages from the horizontal drive circuit 410 to perform a scan in the horizontal direction. The gate electrodes 255 receive pulse voltages from a gate-voltage control circuit of the vertical drive circuit 420 to perform a scan in the vertical direction. This will later be described in detail by referring to FIG. 3.

Although not illustrated in FIGS. 2A and 2B, each unit area 256 may be provided with a convergence electrode on the gate electrode 255 via an insulator to surround the cathodes 253, thereby converging electrons emitted from the cathodes 253 on the photoelectric conversion film 230.

In such imaging device 200, light arriving from above the translucent substrate 210 passes through the translucent substrate 210 and the translucent conductive film 220 to reach the photoelectric conversion film 230. This transmitted light causes electron and hole pairs to be generated in the photoelectric conversion film 230.

When a voltage higher than the voltage applied to the cathodes 253 is applied to the translucent conductive film 220 by the power supply 611 of the external circuit 610, the holes in the photoelectric conversion film 230 move in the photoelectric conversion film 230 toward the electron emission array 250 (i.e., move in the thickness direction of the photoelectric conversion film 230 toward the electron emission array 250) to be accumulated in the photoelectric conversion film 230 on the side closer to the electron emission array 250.

The electron emission array 250 receives pulse voltages from the drive circuit 400.

Figure 3:
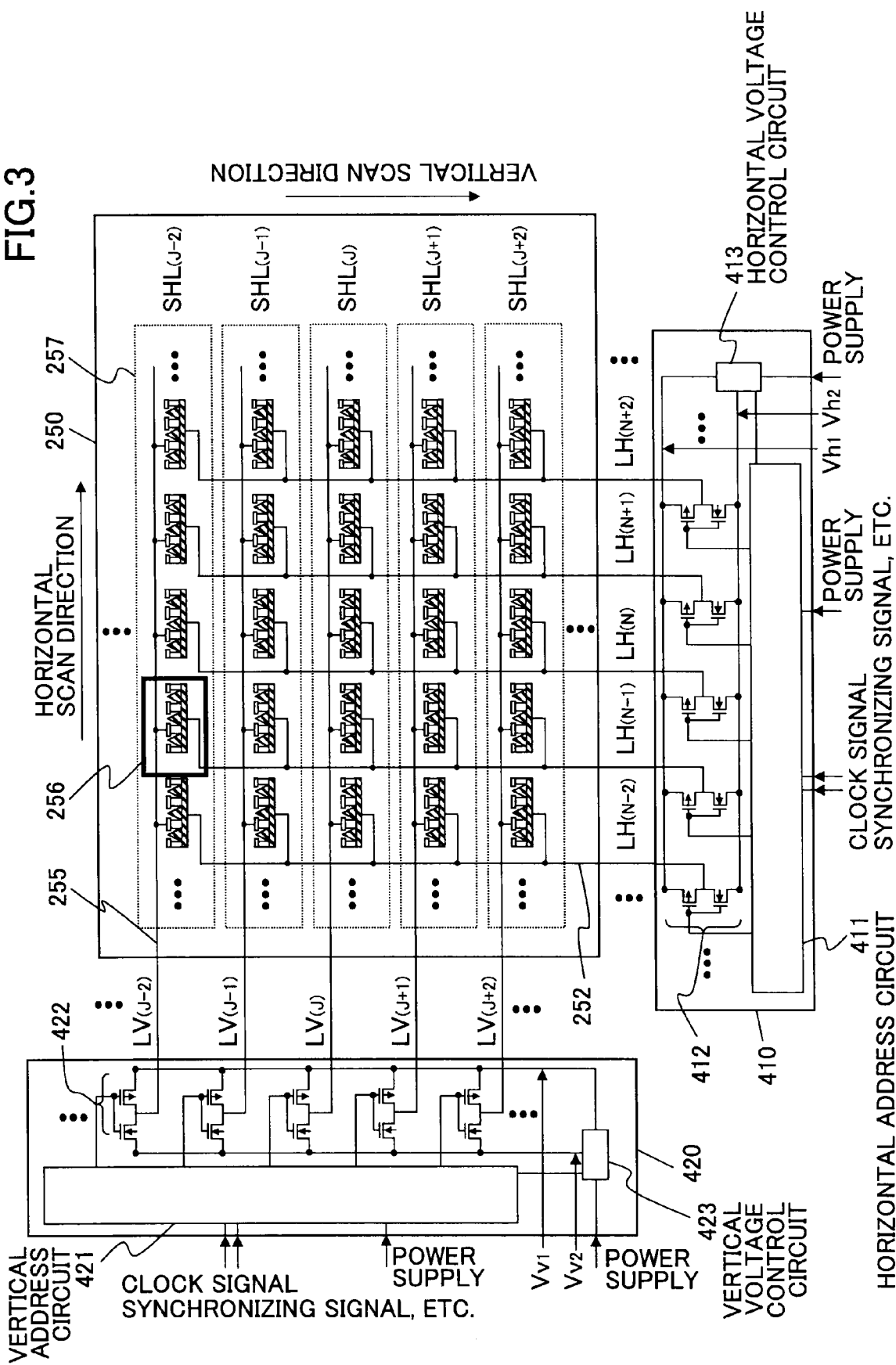
FIG. 3 is a schematic plan view of a drive system of an electron emission array included in the imaging apparatus according to the first embodiment.

FIG. 3 is a schematic plan view of a drive system of the electron emission array 250 included in the imaging apparatus according to the first embodiment.

In the following, the cathode electrodes 252 may sometimes be referred to as cathode electrodes LH for the sake of convenience of explanation which will later be given with respect to pulse voltages applied to the electron emission array 250. The cathode electrodes LH are arranged in the horizontal scan direction. In FIG. 3, cathode electrodes LH(N−2) through LH(N+2) are shown instead of showing all the cathode electrodes LH. N is any integer number.

By the same token, the gate electrodes 255 may sometimes be referred to as gate electrodes LV. The gate electrodes LV are arranged in the vertical scan direction of the imaging device 200. In FIG. 3, gate electrodes LV(J−2) through LV(J+2) are shown instead of showing all the gate electrodes LV. J is any integer number.

By the same token, the horizontal scan line 257 may sometimes be referred to as a horizontal scan line SHL. Horizontal scan lines SHL are provided as many as there are gate electrodes LV in the vertical scan direction. In FIG. 3, horizontal scan lines SHL(J−2) through SHL(J+2) are shown instead of showing all the horizontal scan lines SHL. J is any integer number.

As shown in FIG. 3, the electron emission array 250 is connected to the horizontal drive circuit 410 and the vertical drive circuit 420 for performing scans in the horizontal direction and in the vertical direction.

The horizontal drive circuit 410 includes a horizontal address circuit 411, horizontal buffer circuits 412, and a horizontal voltage control circuit 413.

The horizontal address circuit 411 receives electric power from the power supply unit 600 shown in FIG. 1. The horizontal address circuit 411 also receives a clock signal and synchronizing signals supplied from the control circuit 500 to select and drive one of the horizontal buffer circuits 412 provided for the respective cathode electrodes LH.

The horizontal buffer circuit 412 includes a pair of transistors driven by the horizontal address circuit 411. The horizontal buffer circuit 412 supplies pulse voltages to a cathode electrode LH selected by the horizontal address circuit 411.

The horizontal voltage control circuit 413 is controlled by the horizontal address circuit 411. The horizontal voltage control circuit 413 controls the pulse voltages supplied to the cathode electrodes LH via the horizontal buffer circuits 412.

In such horizontal drive circuit 410, the pulse voltages generated and output from the horizontal address circuit 411 drive and control the horizontal buffer circuits 412. Through the driving of the horizontal buffer circuit 412, the pulse voltages (amplitude: Vh1−Vh2) comprised of voltages Vh1 and Vh2 (Vh1>Vh2) supplied from the horizontal voltage control circuit 413 are supplied to the cathode electrodes LH. In this manner, a scan in the horizontal direction is performed by applying pulse voltages from the horizontal drive circuit 410 to the cathode electrodes LH.

The vertical drive circuit 420 includes a vertical address circuit 421, vertical buffer circuits 422, and a vertical voltage control circuit 423.

The vertical drive circuit 420 has the same configuration as the horizontal drive circuit 410, except that the vertical drive circuit 420 is connected to the gate electrodes LV of the electron emission array 250 to supply pulse voltages to the gate electrodes LV. The function and operation of the vertical address circuit 421, the vertical buffer circuits 422, and the vertical voltage control circuit 423 are also the same as those of the horizontal address circuit 411, the horizontal buffer circuits 412, and the horizontal voltage control circuit 413, except that the gate electrodes LV are subjected to scan.

In such vertical drive circuit 420, the pulse voltages generated and output from the vertical address circuit 421 drive and control the vertical buffer circuits 422. Through the driving of the vertical buffer circuits 422, pulse voltages (amplitude: Vv1−Vv2) comprised of voltages Vv1 and Vv2 (Vv1>Vv2) supplied from the vertical voltage control circuit 423 are supplied to the gate electrodes LV. In this manner, a scan in the vertical direction is performed by applying pulse voltages from the vertical drive circuit 420 to the gate electrodes LV.

In the configuration shown in FIG. 3, one of the cathode electrodes LH is successively selected to receive pulse voltages, thereby performing a scan in the horizontal direction by use of the cathode electrodes LH, and one of the gate electrodes LV is successively selected to receive pulse voltages, thereby performing a scan in the vertical direction by use of the gate electrodes LV. Alternatively, provision may be made such that a scan in the vertical direction is performed by use of the cathode electrodes LH, and a scan in the horizontal direction is performed by use of the gate electrodes LV.

Figure 4:
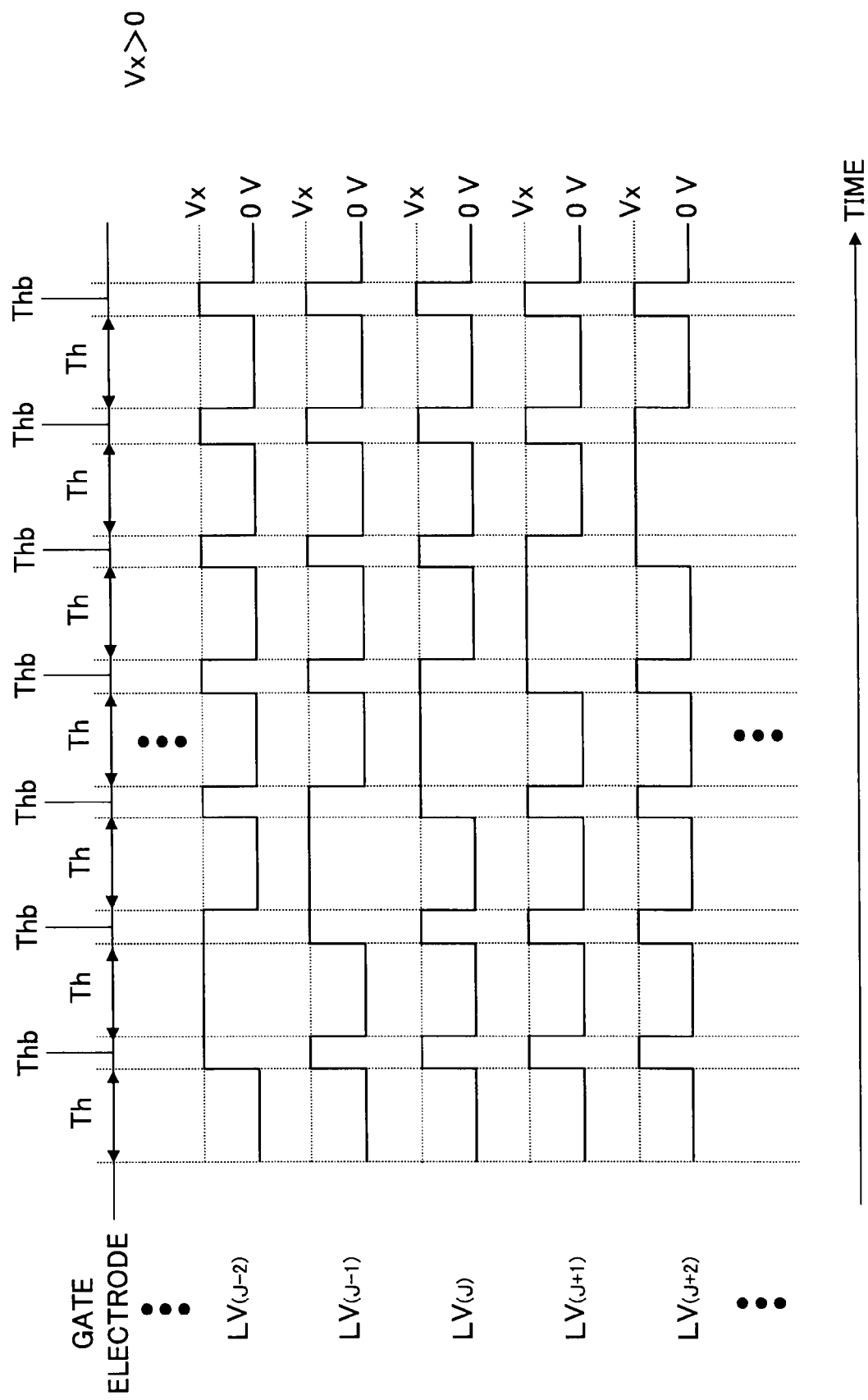
FIG. 4 is a drawing showing the amplitude and timing of pulse voltages applied to gate electrodes LV of the electron emission array in the imaging apparatus having the drive system shown in FIG. 3.

FIG. 4 is a drawing showing the amplitude and timing of pulse voltages applied to the gate electrodes LV of the electron emission array 250 in the imaging apparatus having the drive system shown in FIG. 3.

In FIG. 4, the voltages Vv1 and Vv2 of the pulse voltages supplied from the vertical voltage control circuit 423 to the gate electrodes LV of the electron emission array 250 are selected such that Vv1 is Vx (Vx>0 V), and Vv2 is the ground potential (0 V).

Figure 5:
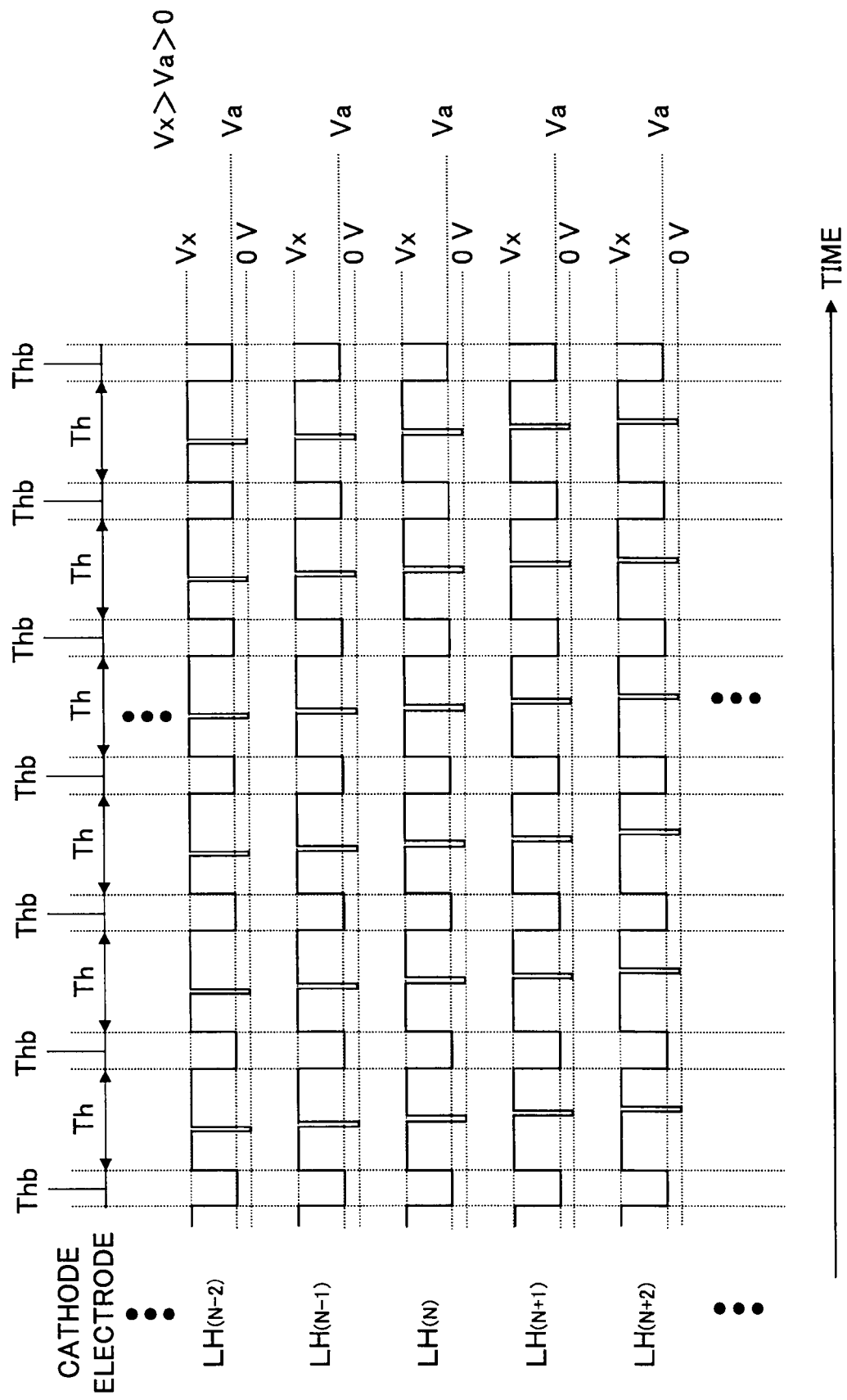
FIG. 5 is a drawing showing the amplitude and timing of pulse voltages applied to cathode electrodes LH of the electron emission array in the imaging apparatus having the drive system shown in FIG. 3.

FIG. 5 is a drawing showing the amplitude and timing of pulse voltages applied to the cathode electrodes LH of the electron emission array 250 in the imaging apparatus having the drive system shown in FIG. 3.

In FIG. 5, the voltages Vh1 and Vh2 of the pulse voltages supplied from the horizontal voltage control circuit 413 to the cathode electrodes LH of the electron emission array 250 are selected such that Vh1 is Vx or Va (Vx>Va>0 V), and Vh2 is the ground potential (0 V), or such that Vh1 is Vx, and Vh2 is Va or the ground potential.

In FIG. 4 and FIG. 5, Th represents a video signal output period in a horizontal scan, and Thb represents a horizontal blanking period.

When the pulse voltages shown in FIG. 4 and FIG. 5 are applied to the electron emission array 250, electrons are emitted from the cathodes 253 that are included in the unit area 256 situated at the intersection between a gate electrode LV receiving the voltage Vx and a cathode electrode LH receiving voltage 0 V or Va, i.e., emitted from the element situated at the intersection between a gate electrode LV receiving the voltage Vx and a cathode electrode LH receiving voltage 0 V or Va.

In the video signal output period Th in a horizontal scan, thus, electrons are successively emitted from the elements included in a single horizontal scan line 257 shown in FIG. 3. This operation is successively repeated for each of the horizontal scan lines 257, thereby providing scans in the horizontal direction and vertical direction of the electron emission array 250.

Electrons successively emitted from the elements of the electron emission array 250 shown in FIG. 2 in the video signal output period Th of a horizontal scan are pulled out toward the photoelectric conversion film 230 by the mesh electrode 240 receiving a voltage higher than the voltage (Vx) applied to the gate electrodes 255. When the electrons emitted from a given element reach the photoelectric conversion film 230, these electrons define a spot size on the photoelectric conversion film 230. An area corresponding to this spot size is referred to as a "pixel".

When electrons emitted from the electron emission array 250 and holes accumulated in the photoelectric conversion film 230 are coupled with each other, an electric current flows through the external circuit 610 via the translucent conductive film 220. This electric current is detected as an output signal, which is amplified and processed by the signal amplifying and processing circuit 300 to produce a video signal responsive to an incident light image.

When all the holes accumulated in the photoelectric conversion film 230 are read by use of electrons emitted from the electron emission array 250 during the video signal output period Th on a horizontal scan, the potential of the photoelectric conversion film 230 on the side closer to the electron emission array 250 is reset to the potential (0 V) of the cathodes 253 that is used at the time of electron emission in the video signal output period Th on a horizontal scan. Upon subsequent entry of light into the photoelectric conversion film 230, holes generated by the light are accumulated in the photoelectric conversion film 230 on the side closer to the electron emission array 250, resulting in an increase of potential at the corresponding position.

As shown in FIG. 4, all the gate electrodes LV receive the voltage Vx in each horizontal blanking period Thb. As shown in FIG. 5, all the cathode electrodes LH receive the voltage Va (Vx>Va>0 V) in each horizontal blanking period Thb. As a result, the electron sources (i.e., the cathodes 253 of all the unit areas 256) included in all the horizontal scan lines 257 emit electrons in each horizontal blanking period Thb.

When a large amount of holes are generated and accumulated in the photoelectric conversion film 230 in response to highly bright light, the potential of the photoelectric conversion film 230 at the corresponding position may exceed Va. In such a case, electrons emitted from the cathodes 253 having the voltage Va in each horizontal blanking period Thb remove holes accumulated at this position until the potential at this position drops to Va. With this arrangement, thus, it is possible to selectively remove only the excessive holes accumulated in the photoelectric conversion film 230 at the position corresponding to the position of highly bright incident light.

The above-described embodiment has been directed to an example in which the voltage Va is applied to the cathode electrodes LH in each horizontal blanking period Thb as shown in FIG. 5 to remove only excessive holes generated and accumulated in the photoelectric conversion film 230. Alternatively, voltage 0 V may be applied to the cathode electrodes LH in each horizontal blanking period Thb, and the power supply 611 shown in FIG. 2A is controlled such that a voltage lower than the voltage applied to the photoelectric conversion film 230 during the video signal output period Th is applied to the photoelectric conversion film 230 in each horizontal blanking period Thb.

Figure 6:
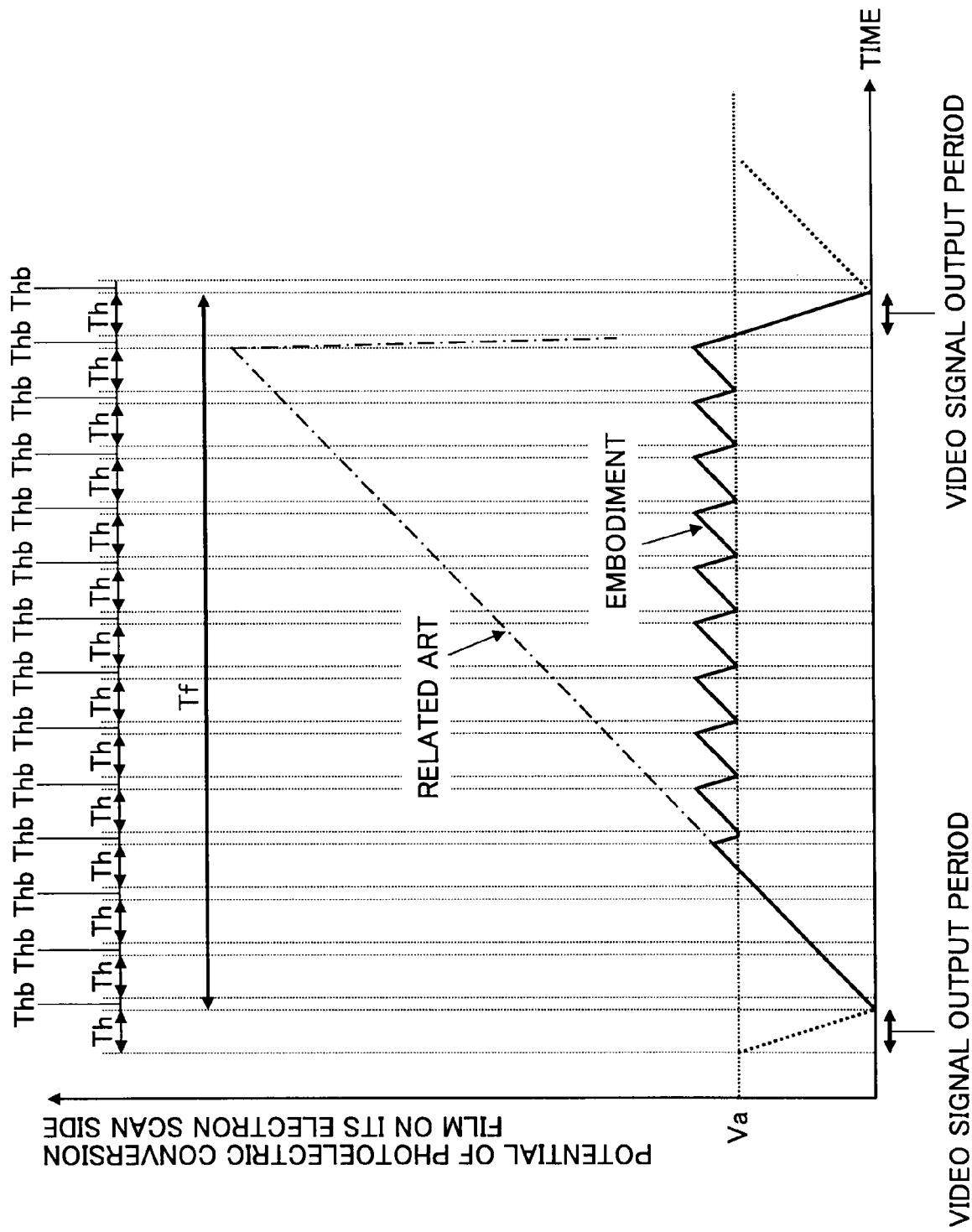
FIG. 6 is a drawing showing changes in the potential of a photoelectric conversion film on the side closer to the electron emission array in the case in which highly bright light enters the photoelectric conversion film at position corresponding to a given horizontal scan line.

FIG. 6 is a drawing showing changes in the potential of the photoelectric conversion film 230 on the side closer to the electron emission array 250 in the case in which highly bright light enters the photoelectric conversion film 230 at position corresponding to a given horizontal scan line 257.

The voltage Va applied to the cathode electrodes 252 in each horizontal blanking period Thb is set lower than the potential (Vt) of the photoelectric conversion film 230 on the side closer to (facing) the electron emission array 250. Here, this potential (Vt) is determined by the maximum amount of holes that can be read out by the electrons emitted from the elements included in a horizontal scan line 257 during the video signal output period. With this arrangement, all the holes accumulated in the photoelectric conversion film 230 can be read out within the video signal output period even when highly bright light enters. This serves to prevent the generation of capacitive residual images.

It should be noted that when electrons are emitted from the elements of a horizontal scan line 257 in the video signal output period Th, the total amount of electrons that reaches the photoelectric conversion film at the opposite side is equal to the maximum amount of holes that is readable by the electrons reaching the photoelectric conversion film. Voltage Vt can thus be derived by dividing the amount of electric charge responsive to the total number of electrons reaching the photoelectric conversion film, out of electrons emitted from the elements of a horizontal scan line 257 in the video signal output period Th, by the capacitance of the portion of the photoelectric conversion film corresponding to this horizontal scan line 257. Further, the total number of electrons reaching the photoelectric conversion film, out of the electrons emitted from each element of a horizontal scan line 257 in the video signal output period Th, is determined by a product of the aperture ratio of the mesh electrode 240, the length of the video signal output period Th, and the amount of electrons emitted from one element per unit time responsive to voltage Vx applied to the gate electrodes LV and voltage 0 V applied to the cathode electrodes LH.

In the present embodiment, the period of one field is equal to the period of one frame (which is referred to as a period Tf). Even when these periods differ from each other, the potential of the photoelectric conversion film 230 is reduced to Va in each horizontal blanking period Thb after the potential of the photoelectric conversion film 230 on the side closer to the electron emission array 250 increases in response to highly bright incident light that continues to enter over one field or frame period. It is thus possible to suppress a rise in the potential of the photoelectric conversion film 230 on the side closer to the electron emission array 250 over the entire period Tf. This serves to prevent the generation of photoconductive residual images.

Moreover, even when highly bright light enters, an increase in the potential of the photoelectric conversion film 230 on the side closer to the electron emission array 250 is suppressed in each horizontal blanking period Thb with respect to all the horizontal scan lines 257. This serves to prevent the occurrence of blooming caused by the bending of electrons, thereby providing satisfactory image resolution.

Figure 7:
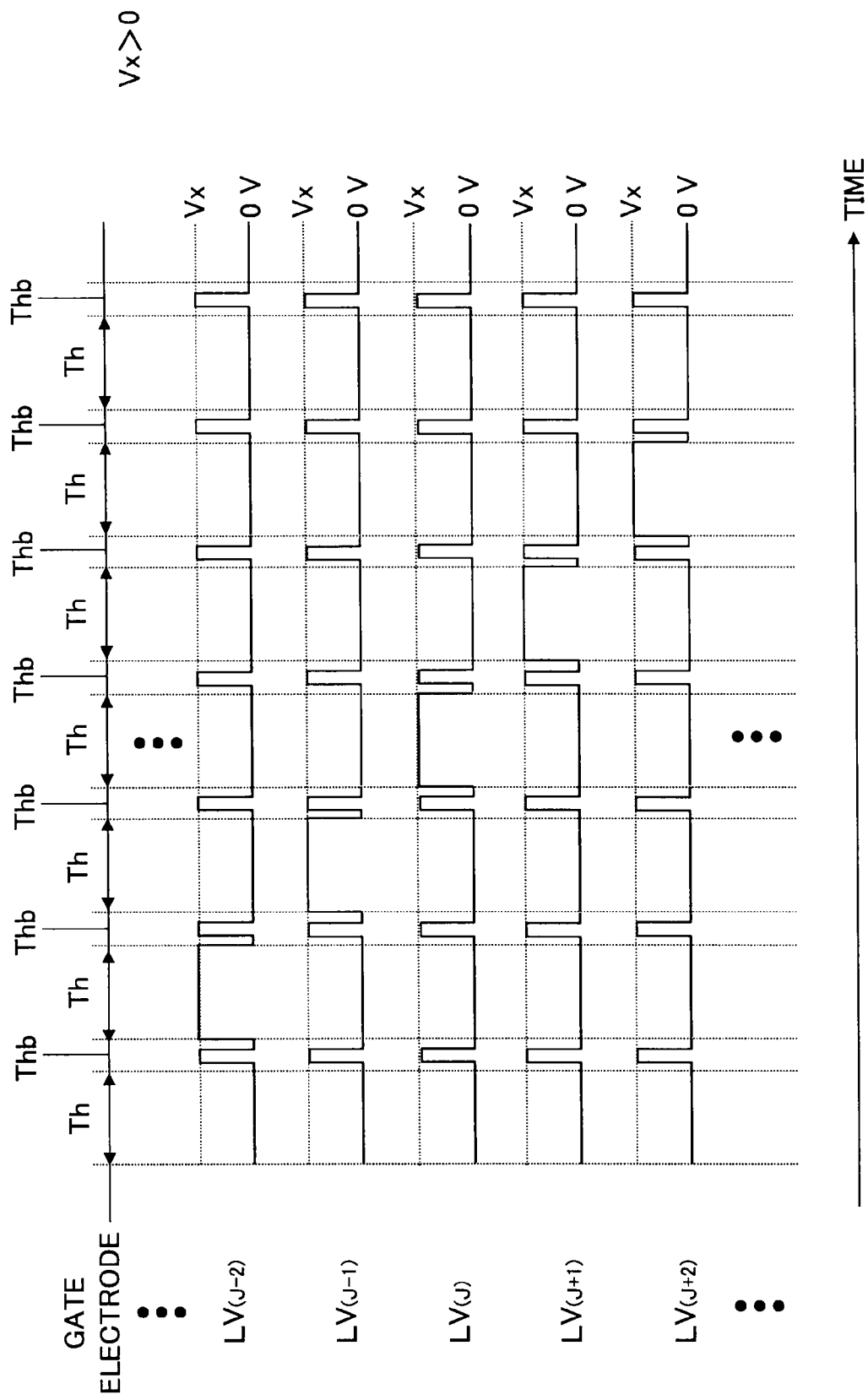
FIG. 7 is a drawing showing the amplitude and timing of other pulse voltages applied to the gate electrodes LV of the imaging apparatus of the first embodiment.

The above-described embodiment has been directed to an example in which voltage Vx is applied to the gate electrodes LV over the entirety of each horizontal blanking period Thb. Alternatively, as shown in FIG. 7, provision may be made such that the voltage Vx is applied to the gate electrodes LV only during a partial period of each horizontal blanking period Thb.

The voltage Vx may be intermittently applied as pulses to the gate electrodes LV during each horizontal blanking period Thb.

This serves to shorten the period of continuous electron emission in each horizontal blanking period Thb to reduce the load on the electron emission array 250. Further, the creation of residual images and the degradation of image resolution are prevented despite highly bright light entering the photoelectric conversion film.

Figure 8:
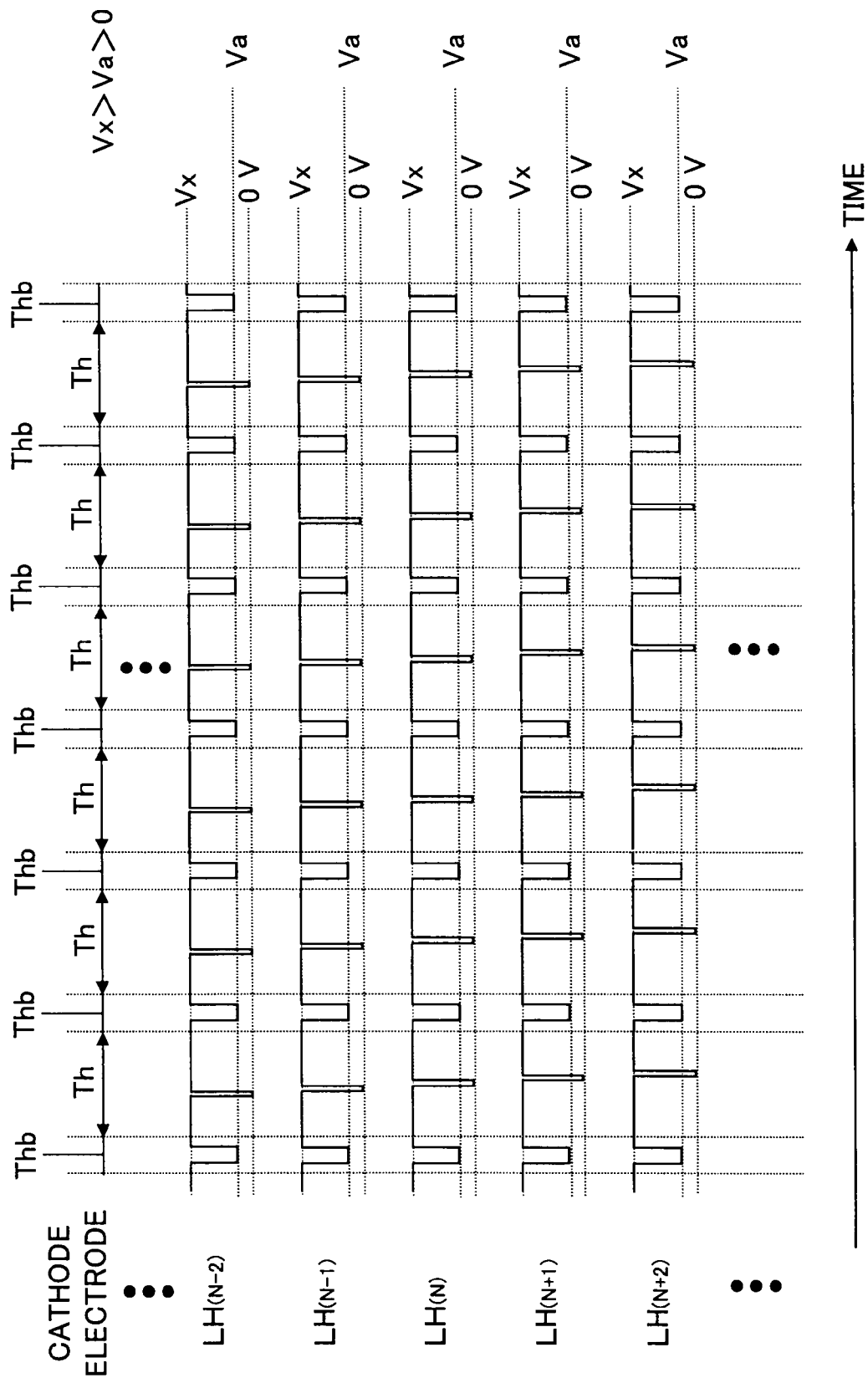
FIG. 8 is a drawing showing the amplitude and timing of other pulse voltages applied to the cathode electrodes LH of the imaging apparatus of the first embodiment.

Moreover, as shown in FIG. 8, the voltage Va may be applied to the cathode electrodes LH only during a partial period of each horizontal blanking period Thb, or may be applied intermittently as pulses to the cathode electrodes LH during each horizontal blanking period Thb. Such configuration achieves the same operation as in the above-described configuration in which voltage is applied as pulses to the gate electrodes, thereby providing the same advantages.

In the present embodiment, the voltage Vx is applied to the gate electrodes LV in each horizontal blanking period Thb, and the voltage Va (Vx>Va>0 V) is applied to the cathode electrodes LH in each horizontal blanking period Thb. In each horizontal blanking period Thb, thus, a voltage equal to Vx−Va is applied between the gate electrodes LV (255) and the cathodes 253. During the video signal output period, on the other hand, the voltage Vx that is larger than the voltage applied during each horizontal blanking period Thb is applied between the gate electrodes LV (255) and the cathodes 253.

With this arrangement, the amount of electron emitted from each element per unit time during the horizontal blanking period Thb is smaller than the amount of electrons emitted from each element per unit time during the video signal output period.

Figure 9:
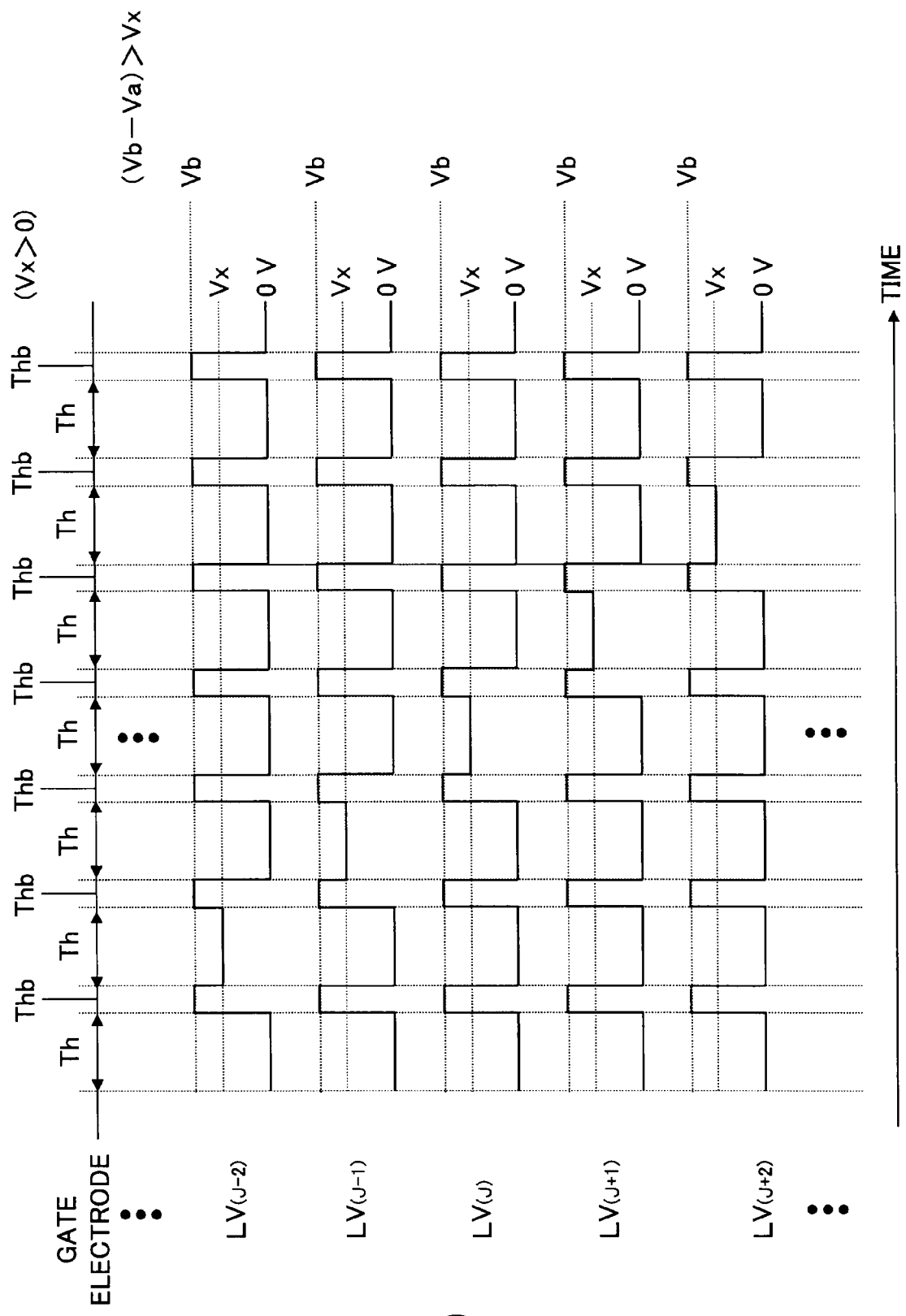
FIG. 9 is a drawing showing the amplitude and timing of other pulse voltages applied to the gate electrodes LV of the imaging apparatus of the first embodiment.

Provision may be made such that the voltage supplied from the vertical voltage control circuit 423 to the gate electrodes LV is made to vary between the video signal output period Th and the horizontal blanking period Thb on a horizontal scan. As shown in FIG. 9, a voltage Vb that is different from the voltage Vx applied during the video signal output period Th on a horizontal scan may be applied to the gate electrodes LV during the horizontal blanking period Thb, such that the voltage Vb satisfies the condition: (Vb−Va)>Vx.

Such provision serves to cause the amount of electrons emitted from each element per unit time in the horizontal blanking period Thb on a horizontal scan to be greater than the amount of electrons emitted from each element per unit time in the video signal output period Th. The creation of residual images and the degradation of image resolution can thus be prevented even when extremely bright light enters the photoelectric conversion film 230.

The above-described embodiment has been directed to a configuration in which the voltage Vx is applied to all the gate electrodes LV in each horizontal blanking period Thb as shown in FIG. 4. It should be noted that the voltage Vx need not be applied to all the gate electrodes LV in each horizontal blanking period Thb.

Figure 10:
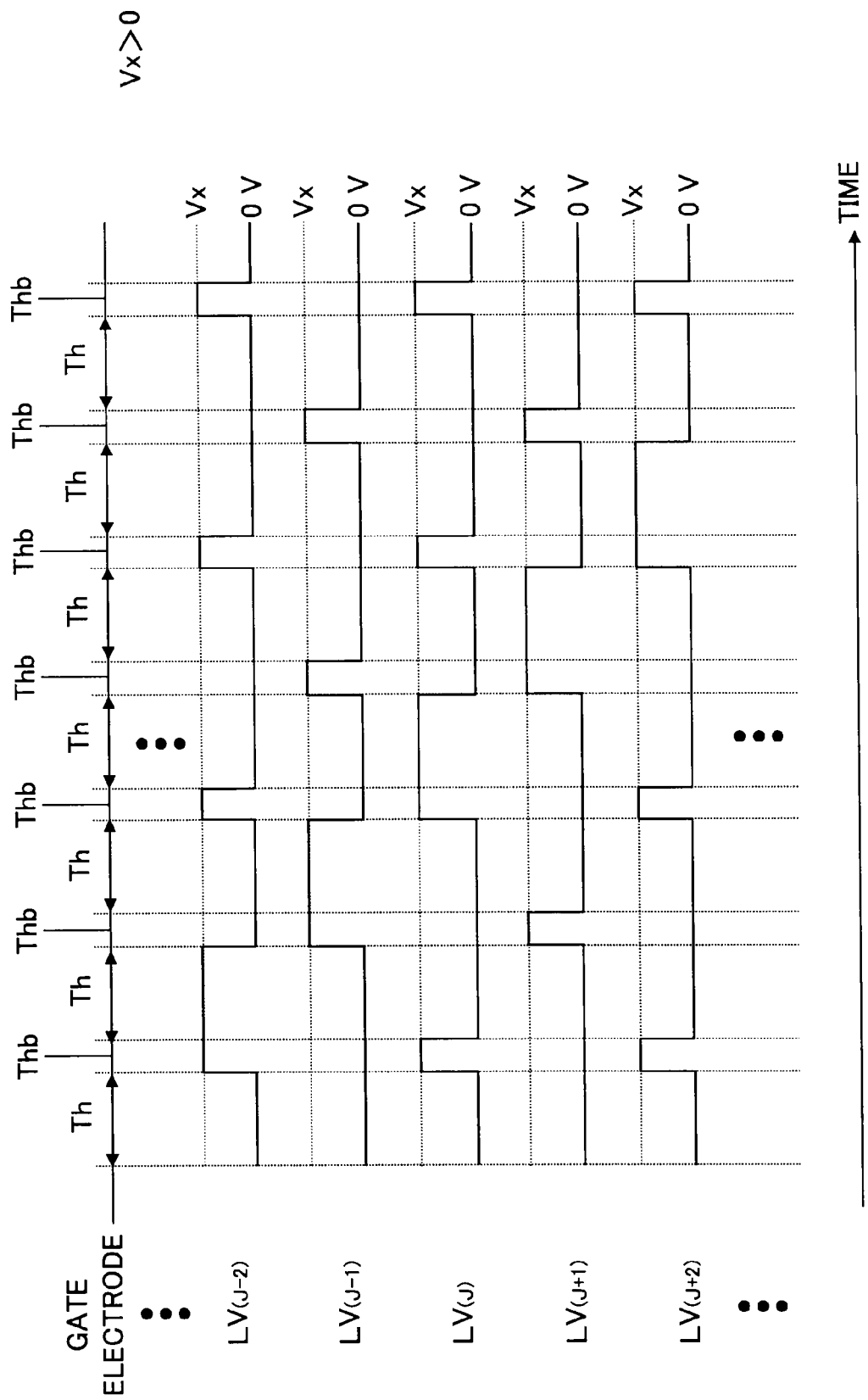
FIG. 10 is a drawing showing the amplitude and timing of other pulse voltages applied to the gate electrodes LV of the imaging apparatus of the first embodiment.

As shown in FIG. 10, for example, a horizontal blanking period Thb during which no voltage is applied may be provided immediately following the video signal output period Th in which the voltage Vx is applied. The voltage Vx may then be applied to the gate electrode LV of interest in every other horizontal blanking period Thb.

In the driving method described above, an increase in the potential of the photoelectric conversion film 230 on the side closer to the electron emission array 250 may be slightly larger in one field or frame period upon the entry of highly bright light into the photoelectric conversion film 230 than in the case where the voltage Vx is applied to all the gate electrodes LV in each horizontal blanking period Thb as shown in FIG. 4. On the other hand, such driving method serves to prevent the creation of residual images and the degradation of image resolution while reducing the load on the electron emission array 250 to ensure its reliability and increased product life.

The example shown in FIG. 10 is directed to a case in which a horizontal blanking period Thb without the application of the voltage Vx is provided, and the voltage Vx is then applied to the gate electrode LV of interest in every other horizontal blanking period Thb. Alternatively, provision may be made such that the voltage Vx is applied in a set of consecutive horizontal blanking periods Thb, and such set is repeated at intervals with an intervening horizontal blanking period Thb without the application of the voltage Vx. In other words, such sets are spaced apart by an intervening horizontal blanking period Thb without the application of the voltage Vx.

Figure 11:
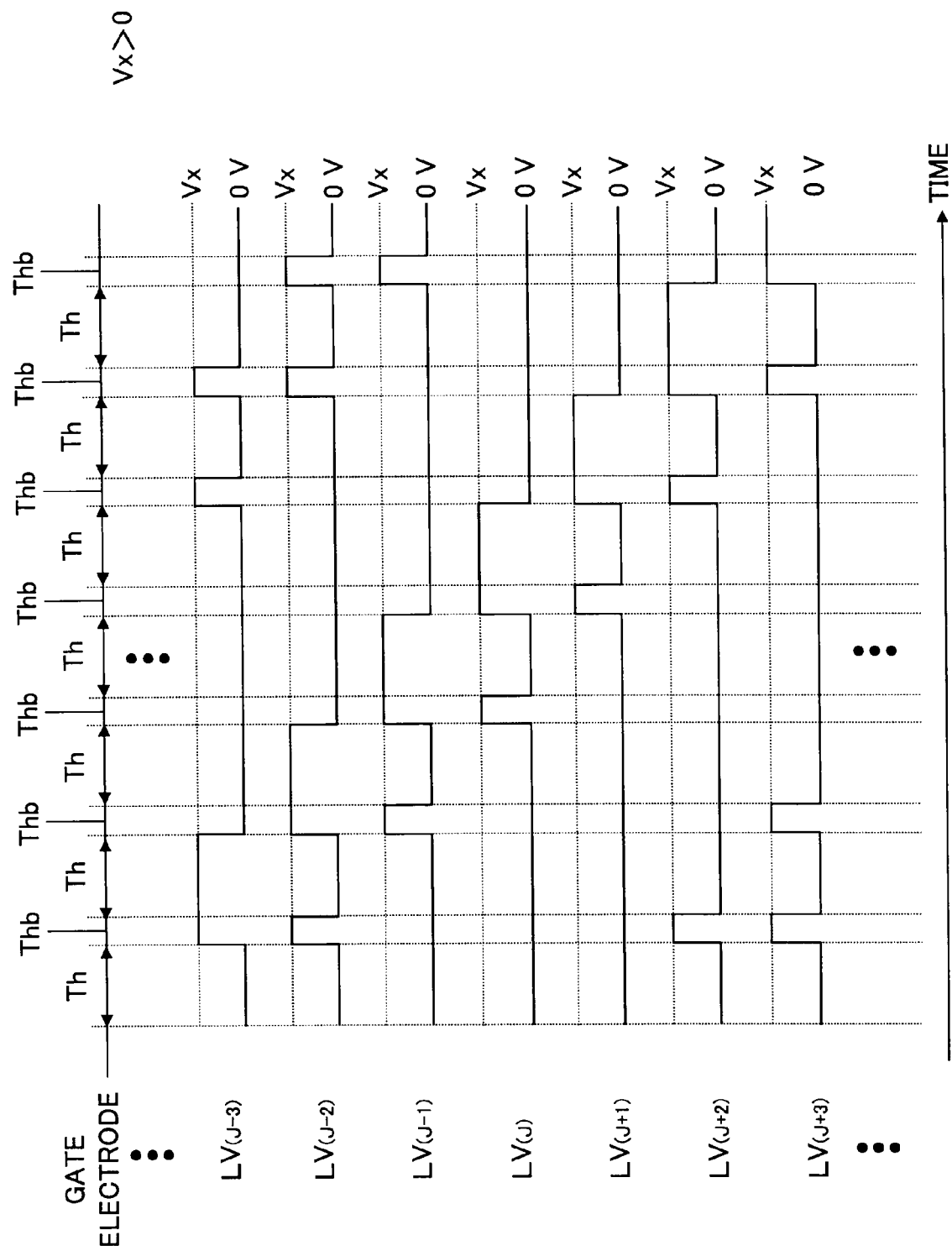
FIG. 11 is a drawing showing the amplitude and timing of other pulse voltages applied to the gate electrodes LV of the imaging apparatus of the first embodiment.
Figure 12:
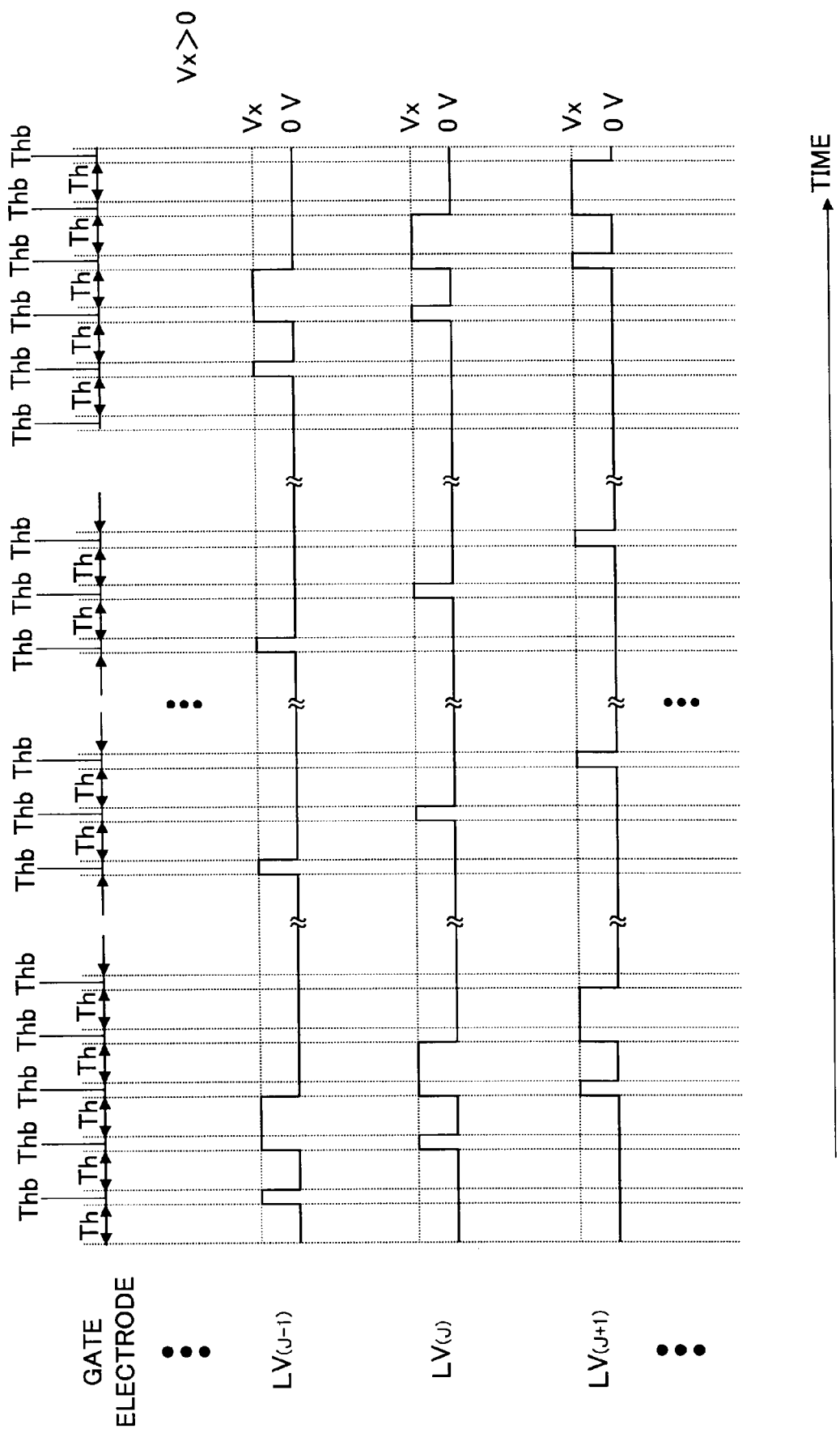
FIG. 12 is a drawing showing the amplitude and timing of other pulse voltages applied to the gate electrodes LV of the imaging apparatus of the first embodiment.

Provision may as well be made such that, as shown in FIG. 11 and FIG. 12, the voltage Vx is applied to the gate electrode LV of interest in a set of one or more consecutive horizontal blanking periods Thb, and such set is repeated at intervals with a plurality of intervening, consecutive horizontal blanking periods Thb without the application of the voltage Vx. In other words, such sets are spaced apart by intervening horizontal blanking periods Thb without the application of the voltage Vx. In such provision, further, the set of the consecutive horizontal blanking periods Thb during which the voltage Vx is applied are shifted as the vertical scan proceeds. The set of the one or more consecutive horizontal blanking periods Thb during which the voltage is applied may include a set comprised of a single horizontal blanking period Thb as shown in FIG. 12 and a set comprised of a plurality of horizontal blanking periods Thb as shown in FIG. 11. These two sets may alternate with each other, for example.

In the driving method described above, an increase in the potential of the photoelectric conversion film 230 on the side closer to the electron emission array 250 may be larger in one field or frame period upon the entry of highly bright light into the photoelectric conversion film 230 than in the case where the voltage pulses as shown in FIG. 10 are applied. On the other hand, such driving method serves to prevent the creation of residual images and the degradation of image resolution while reducing the load on the electron emission array 250 to a greater degree than in the case of voltage pulses shown in FIG. 10 to ensure its reliability and increased product life.

In FIG. 11 and FIG. 12, the voltage Vx is applied to a gate electrode LV of interest in the first preceding horizontal blanking period Thb prior to the video signal output period Th during which the voltage Vx is applied, and the voltage Vx is also applied to the gate electrode LV of interest in the second preceding horizontal blanking period Thb prior to the video signal output period Th. During a horizontal blanking period Thb immediately preceding the outputting of a video signal from a given horizontal scan line 257, therefore, holes accumulated in the photoelectric conversion film 230 are simultaneously removed at the positions corresponding to the two horizontal scan lines 257 from which video signals are to be output on two consecutive scans immediately following this horizontal blanking period Thb.

This serves to prevent the occurrence of blooming caused by the bending of electrons, thereby preventing the degradation of image resolution.

Figure 13:
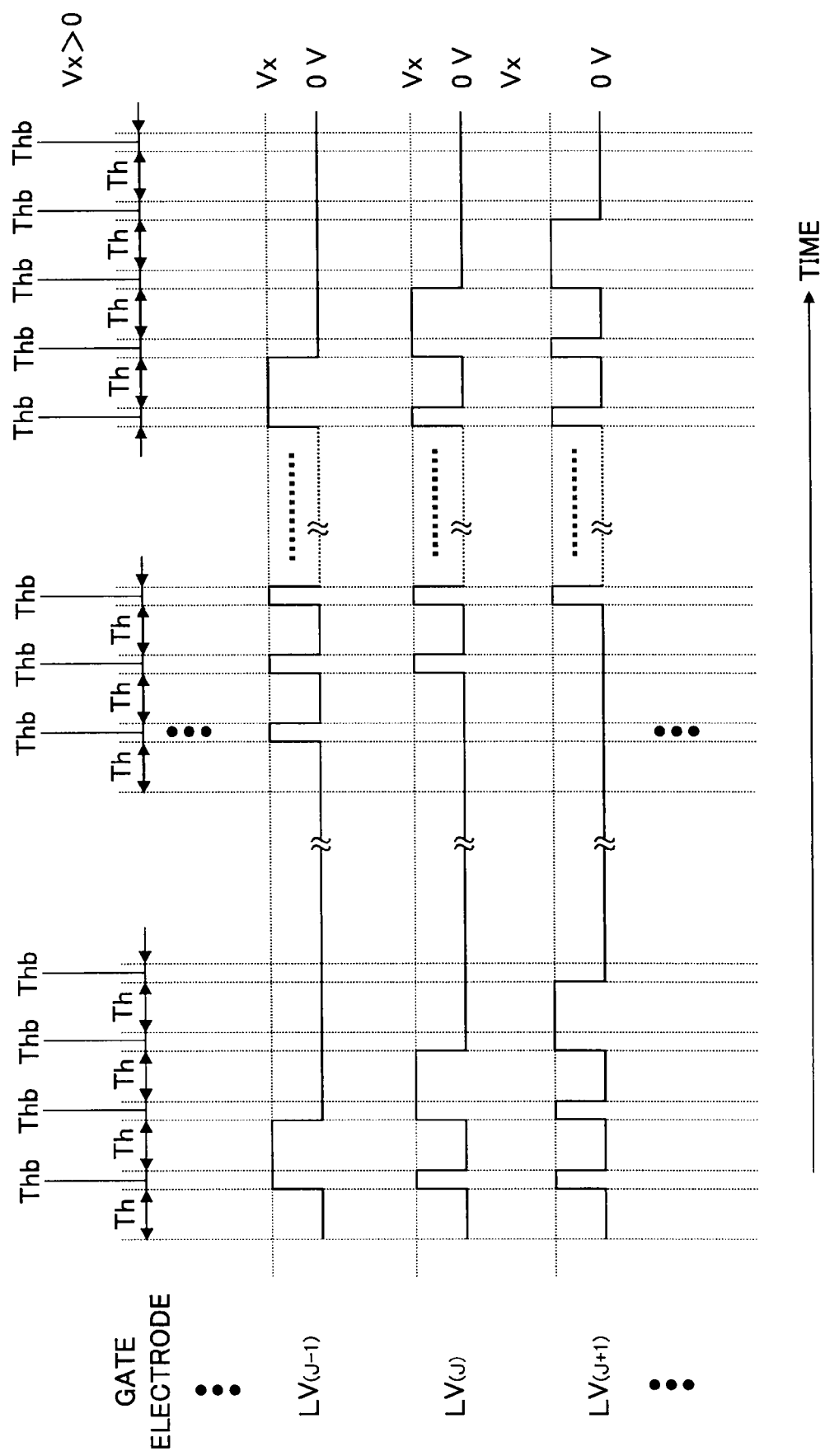
FIG. 13 is a drawing showing the amplitude and timing of other pulse voltages applied to the gate electrodes LV of the imaging apparatus of the first embodiment.

Further, provision may be made such that, as shown in FIG. 13, the voltage Vx is not applied to a gate electrode LV of interest in a plurality of consecutive horizontal blanking periods Thb following the video signal output period Th during which the voltage Vx is applied. In this provision, further, the voltage Vx is applied to the gate electrode LV of interest in a plurality of consecutive horizontal blanking periods Thb appearing before the voltage Vx is applied in the next video signal output period Th.

This provision is made in consideration of the following. When a video signal is output upon applying the voltage Vx to a gate electrode LV of interest in a video signal output period Th, the potential of the photoelectric conversion film 230 on the side closer to the electron emission array 250 is reset. Because of this, there will be a lag before the potential of the photoelectric conversion film 230 on the side closer to the electron emission array 250 increases upon the entry of highly bright light into the photoelectric conversion film 230 that causes a large amount of holes to be accumulated in the photoelectric conversion film 230 on the side closer to the electron emission array 250.

Consequently, the creation of residual images and the degradation of image resolution are prevented by efficiently removing excessive holes accumulated in the photoelectric conversion film 230 in response to the entry of highly bright light while reducing the load on the electron emission array 250.

It should be noted that the voltage pulses shown in FIG. 5 are applied to the cathode electrodes LH when the voltage pulses shown in FIG. 10, FIG. 11, FIG. 12, or FIG. 13 are applied to the gate electrodes LV.

Figure 14:
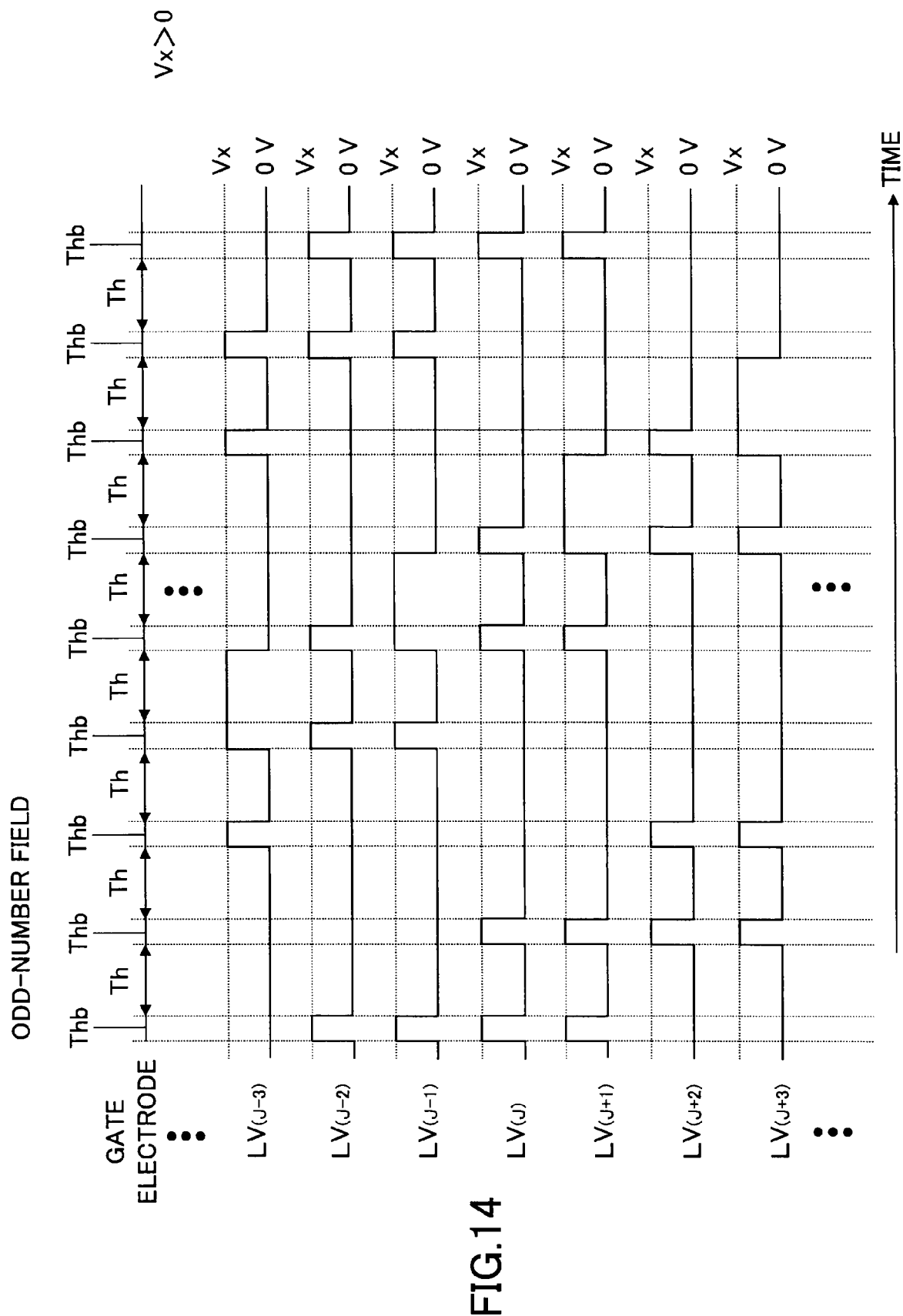
FIG. 14 is a drawing showing the amplitude and timing of other pulse voltages applied to the gate electrodes LV of the imaging apparatus of the first embodiment.
Figure 15:
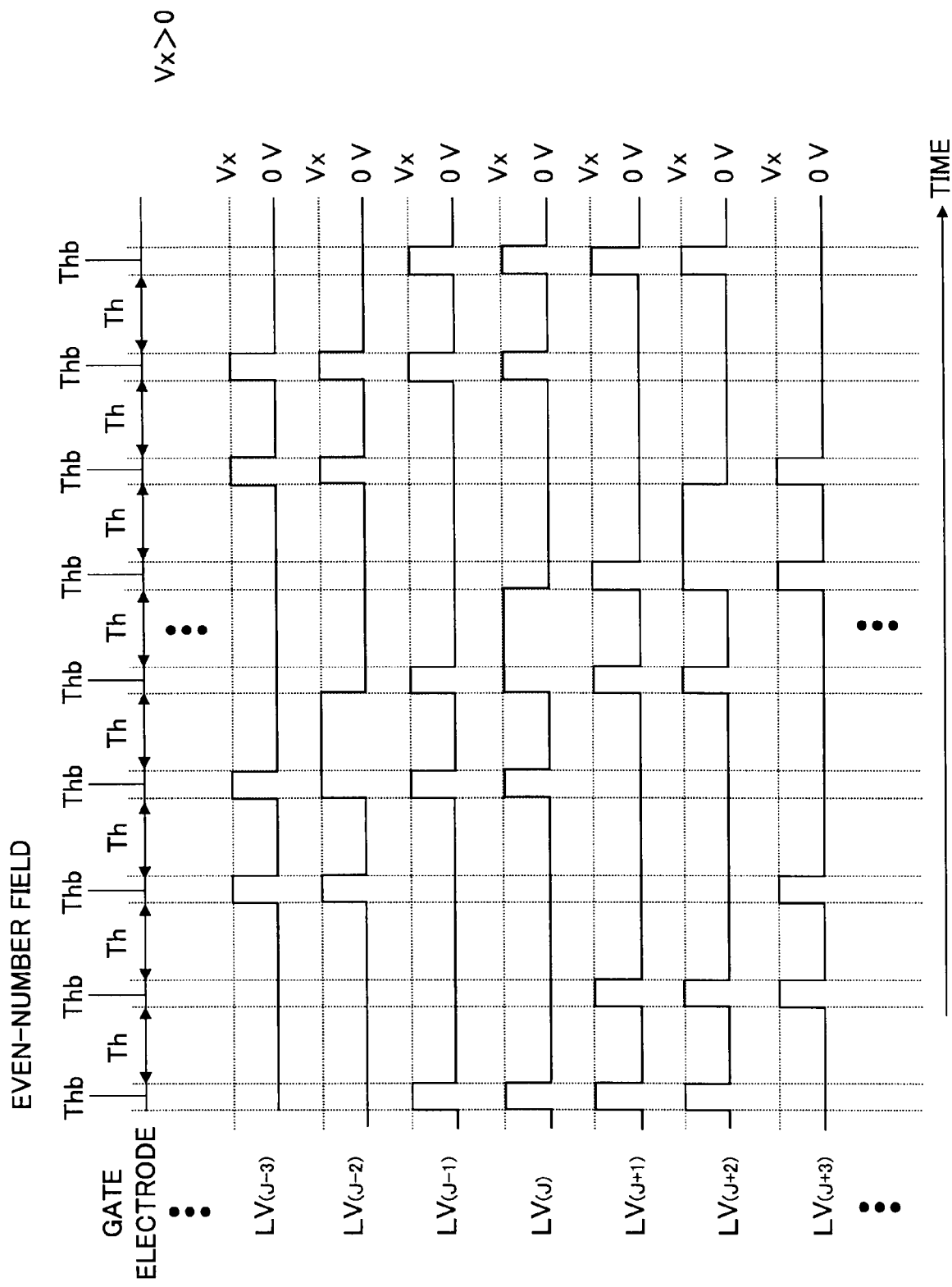
FIG. 15 is a drawing showing the amplitude and timing of other pulse voltages applied to the gate electrodes LV of the imaging apparatus of the first embodiment.

In the embodiment described above, interlace scan may be employed. For example, the voltage pulses as shown in FIG. 5 are applied to the cathode electrodes LH while voltage pulses shown in FIG. 14 are applied to the gate electrodes LV in an odd-number field, and voltage pulses shown in FIG. 15 are applied to the gate electrodes LV in an even-number field. This achieves an interlace scan having a normal interlace ratio of 2:1. With such interlace scan, the creation of residual images and the degradation of image resolution can as well be prevented despite the entry of highly bright light into the photoelectric conversion film 230.

Figure 16:
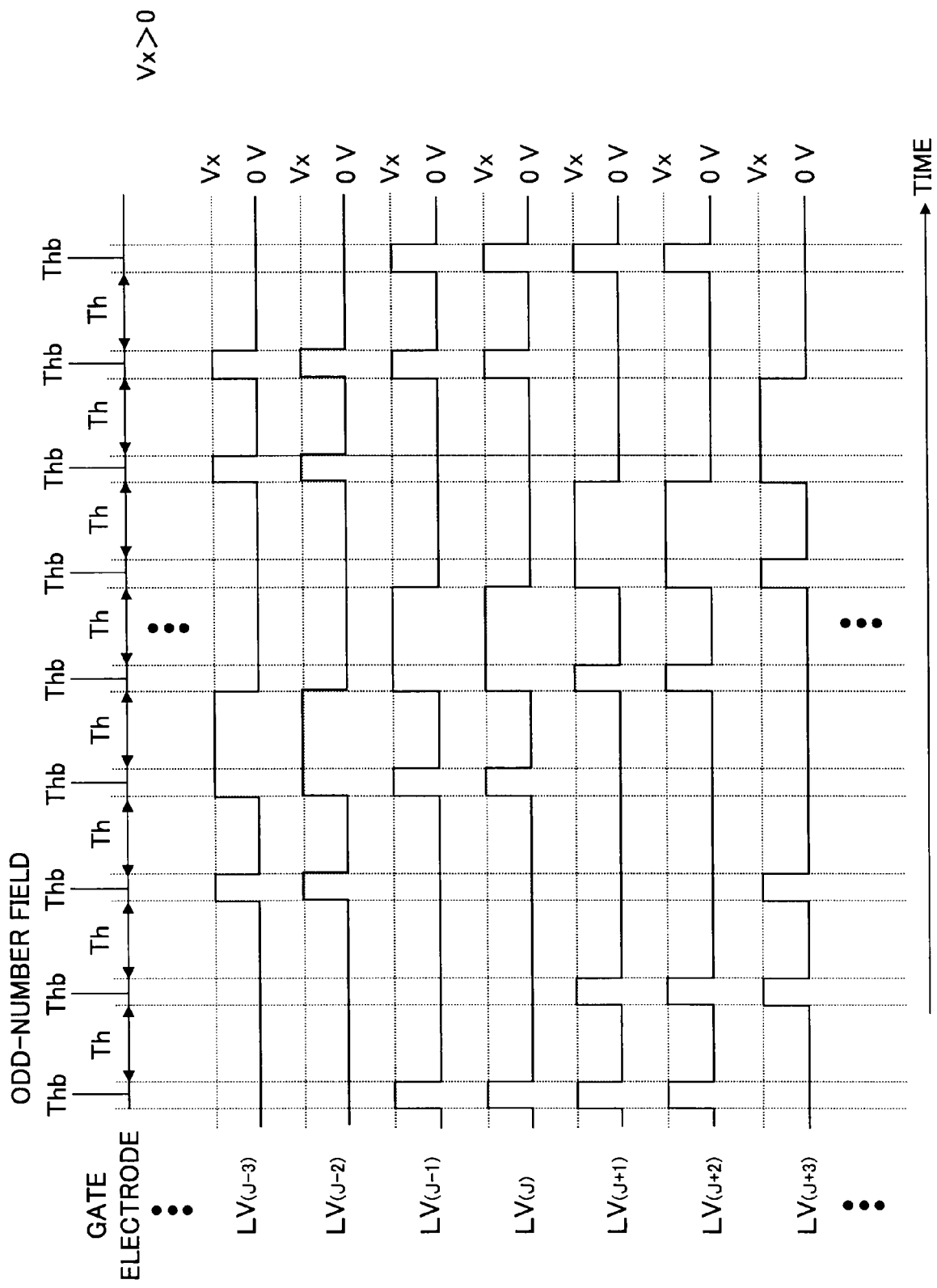
FIG. 16 is a drawing showing the amplitude and timing of other pulse voltages applied to the gate electrodes LV of the imaging apparatus of the first embodiment.
Figure 17:
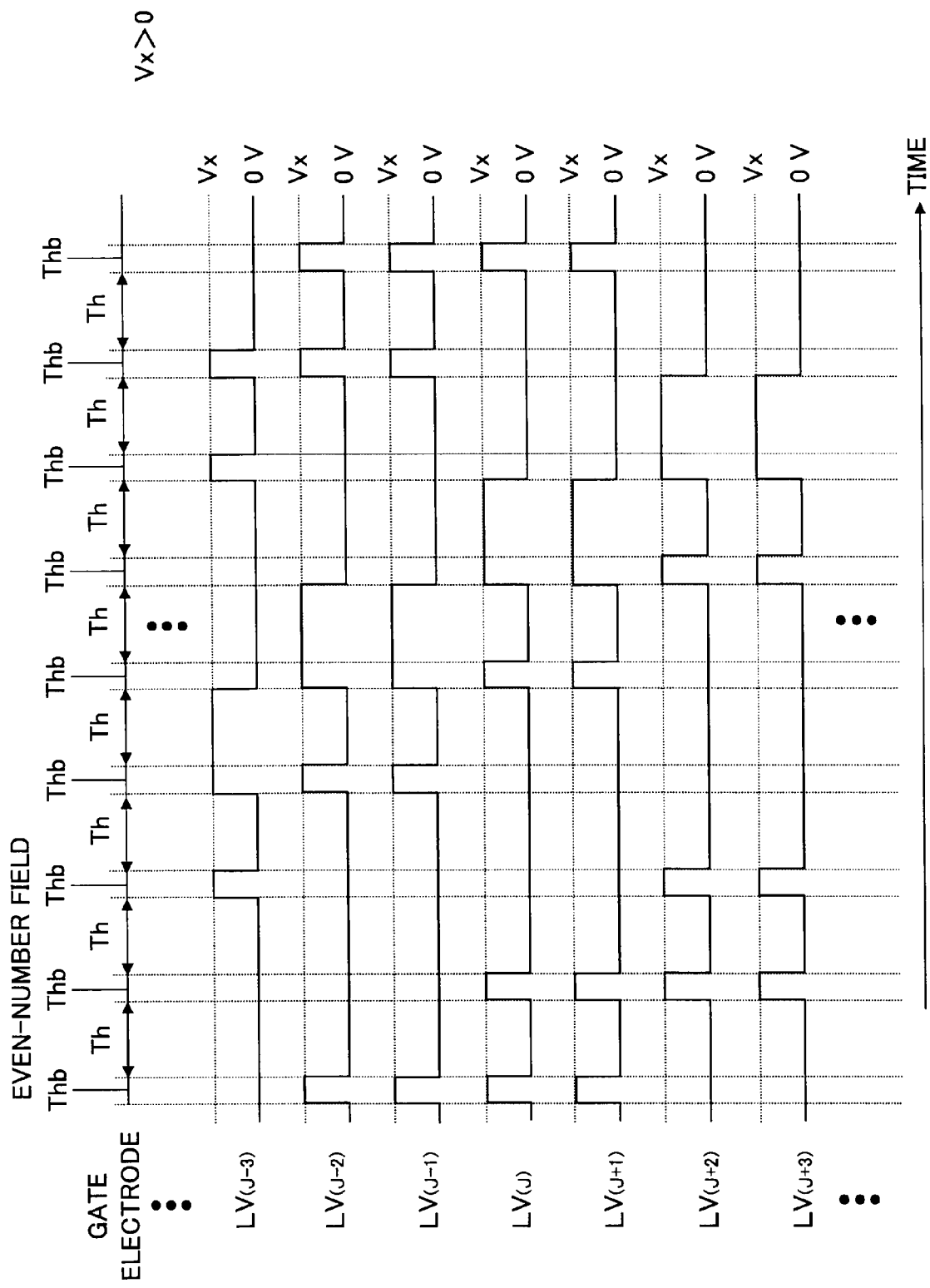
FIG. 17 is a drawing showing the amplitude and timing of other pulse voltages applied to the gate electrodes LV of the imaging apparatus of the first embodiment.

In place of the above-described interlace scan, provision may be made such that the voltage pulses as shown in FIG. 5 are applied to the cathode electrodes LH while voltage pulses shown in FIG. 16 are applied to the gate electrodes LV in an odd-number field, and voltage pulses shown in FIG. 17 are applied to the gate electrodes LV in an even-number field. This makes it possible to add up two video signals from two horizontal scan lines 257 for simultaneous reading. Further, an interlace scan in which an odd-number field and an even-number field use different combinations of two adjacent horizontal scan lines 257 may be used. With such interlace scan, the creation of residual images and the degradation of image resolution can as well be prevented despite the entry of highly bright light into the photoelectric conversion film 230.

Second Embodiment

Figure 18:
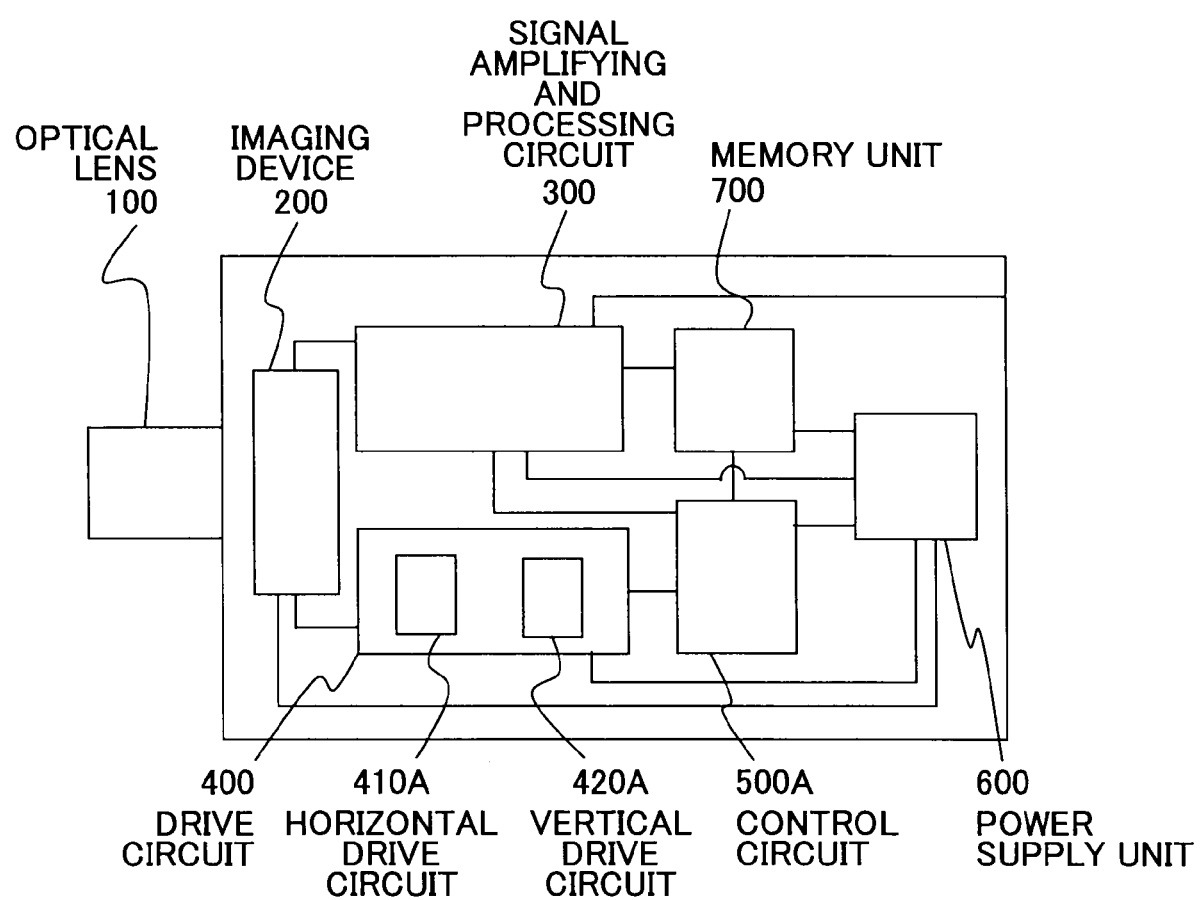
FIG. 18 is a schematic cross-sectional view of an imaging apparatus according to a second embodiment.

FIG. 18 is a schematic cross-sectional view of an imaging apparatus according to a second embodiment. The imaging apparatus of the present embodiment differs from the imaging apparatus of the first embodiment in that a memory unit 700 is provided. Due to the provision of the memory unit 700, the configuration and operation of the imaging device 200 also differ from those of the first embodiment. In the following, a description will be given mainly with respect to such differences. The same elements as those of the imaging apparatus of the first embodiment are referred to by the same numerals, and a description thereof will be omitted.

The memory unit 700 serves to record and store video signals output from the signal amplifying and processing circuit 300. The memory unit 700 may be implemented by use of a known volatile or nonvolatile memory.

A control circuit 500A reads a video signal that is recorded and stored in the memory unit 700. The control circuit 500A generates electron-emission-array control signals based on the signal level (hereinafter referred to as "amplitude") of this video signal for provision to the drive circuit 400.

The drive circuit 400 includes a horizontal drive circuit 410A, a vertical drive circuit 420A, etc., and generates pulse voltages necessary to drive the imaging device 200 based on the clock signal, synchronizing signals, electron-emission-array control signals, and the like supplied from the control circuit 500A.

The configuration shown in FIG. 18 is directed to an example in which the memory unit 700 is used to record and store video signals. Alternatively, a known video delay circuit may be used in place of the memory unit 700.

Figure 19:
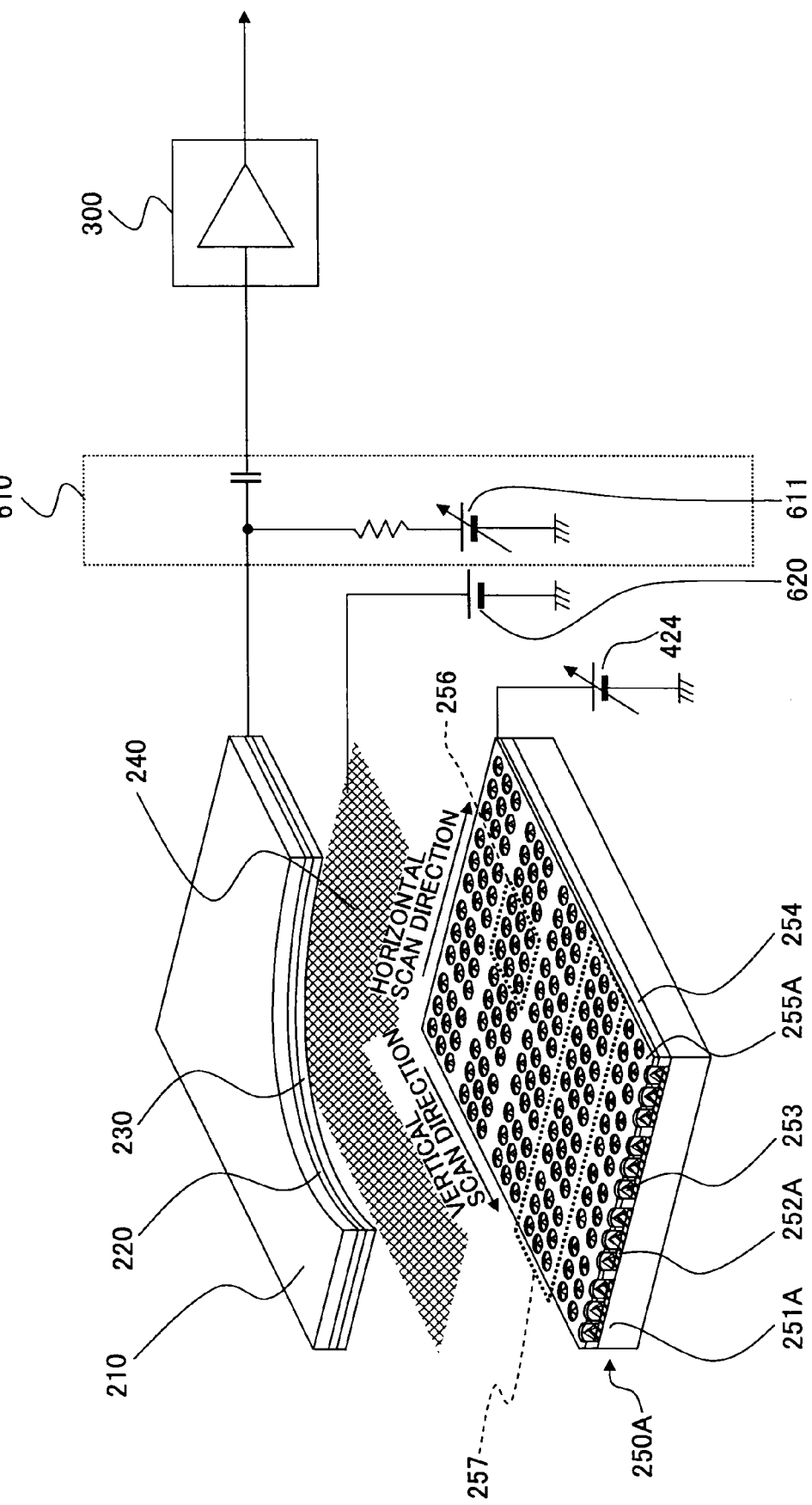
FIG. 19 is a partial-cross-sectional perspective view showing the configuration of an imaging device included in the imaging apparatus according to the second embodiment.
Figure 20:
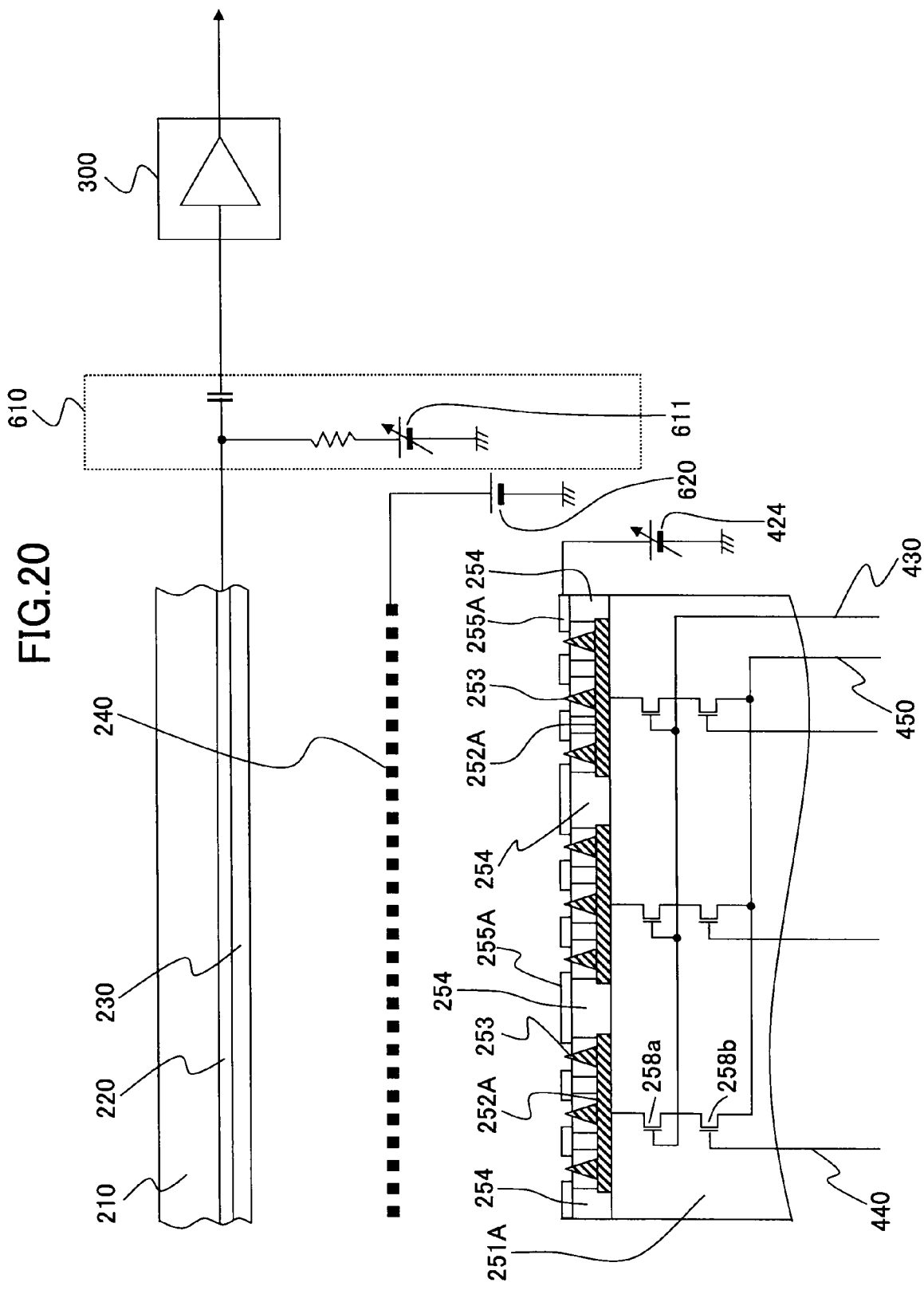
FIG. 20 is a schematic drawing showing the configuration of a main part of the imaging device included in the imaging apparatus according to the second embodiment.

FIG. 19 is a partial-cross-sectional perspective view showing the configuration of the imaging device 200 included in an imaging apparatus according to the second embodiment. FIG. 20 is a schematic drawing showing the configuration of a main part of the imaging device 200 included in the imaging apparatus according to the second embodiment.

The electron emission array of the imaging device 200 used in the present embodiment is a Spindt-type active electron emission array 250A, which is driven by pulse voltages and the like supplied from the drive circuit 400 externally provided, and which has transistors 258a and 258b embedded in the portion of a substrate 251A corresponding to each unit area 256.

Further, there are a variety of methods for driving an electron emission array. The electron emission array 250A may be a passive electron emission array driven by pulse voltages supplied from an external drive circuit, a drive-circuit-embedded passive electron emission array having a drive circuit embedded therein, an active electron emission array having a transistor embedded in each unit area of the array, or a drive-circuit-embedded active electron emission array having a drive circuit embedded therein and also having a transistor embedded in each unit area of the array.

Further, there are a variety of electron emission arrays. The electron emission array 250 may be implemented as a matrix array of known electron emission sources such as Spindt-type emitters having cathodes made of a high-melting-point metal, silicon-type emitters having cathodes made of silicon (Si), or electron field emission sources having porous silicon, silicon oxide, or the like placed between electrodes.

The present embodiment will be described with respect to a case in which a Spindt-type active emitter array is used as the electron emission array 250A. This Spindt-type active emitter array 250A is basically the same as the electron emission array 250 of the first embodiment, except that the substrate 251A, unit-area-specific cathode electrodes 252A, and gate electrode 255A have different configurations. In the following, the term "electron emission array 250A" is intended to refer to a Spindt-type active emitter array 250A unless contrary indication is provided.

The substrate 251A of the electron emission array 250A is made of a known semiconductor such as silicon (Si), gallium arsenide (GaAs), or the like, and includes an X-Y matrix array inclusive of transistors 258a and 258b corresponding to the respective unit areas 256.

The unit-area-specific cathode electrodes 252A formed on the substrate 251A are insulated from each other and spaced apart at predetermined intervals from adjacent unit-area-specific cathode electrodes. The unit-area-specific cathode electrodes 252A are electrically coupled to the transistors 258a.

In the present embodiment, an area defined by a unit-area-specific cathode electrode 252A is referred to as the unit area 256. In each unit area 256, small holes extend through the gate electrode 255A and the insulation layer 254 to reach the surface of the unit-area-specific cathode electrode 252A. The cathodes 253 are disposed in these holes to project from the unit-area-specific cathode electrode 252A. The electron emission sources constituting a minimum unit of electron emission control provided in each unit area 256 are referred to as an "element".

The gate electrode 255A is shared by all the unit areas 256.

Figure 21:
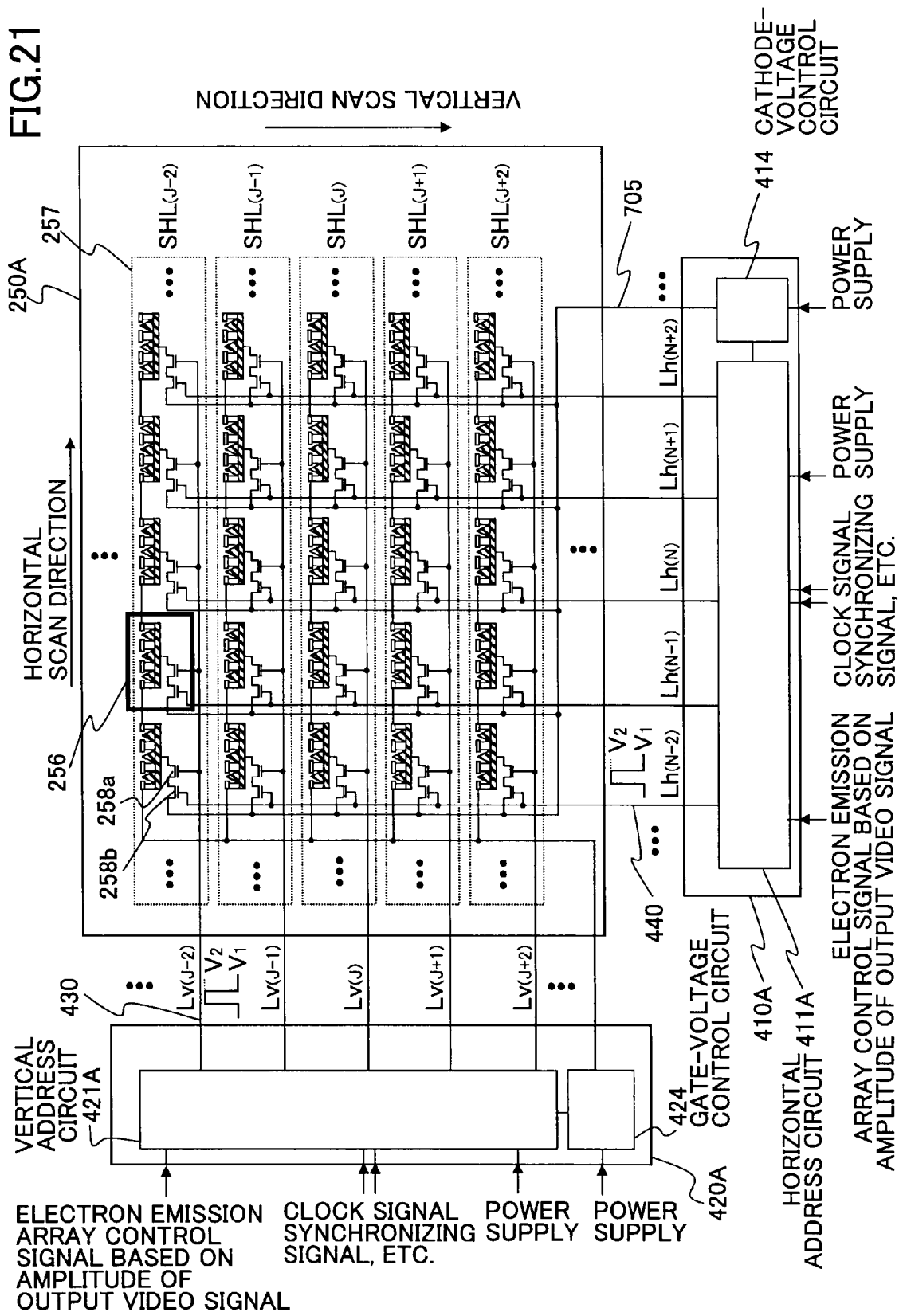
FIG. 21 is a schematic plan view of a drive system of the electron emission array included in the imaging apparatus according to the second embodiment.

FIG. 21 is a schematic plan view of a drive system of the electron emission array 250A included in the imaging apparatus according to the present embodiment.

In the following, a vertical scan control line 430 may sometimes be referred to as a vertical scan control line Lv for the sake of convenience of explanation which will later be given with respect to pulse voltages applied to the electron emission array 430A. The vertical scan control lines Lv are arranged in the vertical scan direction of the imaging device 200. In FIG. 21, vertical scan control lines Lv(J−2) through Lv(J+2) are shown instead of showing all the vertical scan control lines Lv. J is any integer number.

By the same token, a horizontal scan control line 440 may sometimes be referred to as a horizontal scan control line Lh. The horizontal scan control lines Lh are arranged in the horizontal scan direction. In FIG. 21, horizontal scan control lines Lh(N−2) through Lh(N+2) are shown instead of showing all the horizontal scan control lines Lh. N is any integer number.

By the same token, the horizontal scan line 257 may sometimes be referred to as a horizontal scan line SHL. Horizontal scan lines SHL are provided as many as there are vertical scan control lines Lv in the vertical scan direction. In FIG. 21, horizontal scan lines SHL(J−2) through SHL(J+2) are shown instead of showing all the horizontal scan lines SHL. J is any integer number.

A vertical-direction scan for the electron emission array 250A is performed by applying pulse voltages comprised of voltages V1 and V2 (V2>V1) to the vertical scan control lines Lv from the vertical address circuit 421A of the vertical drive circuit 420A to control the transistor 258a in each unit area 256. As the voltage V2 is applied to a vertical scan control line 430, the transistors 258a become conductive.

A horizontal-direction scan for the electron emission array 250A is performed by applying pulse voltages comprised of voltages V1 and V2 (V2>V1) to the horizontal scan control lines Lh from the horizontal address circuit 411A of the horizontal drive circuit 410A to control the transistor 258b in each unit area 258. As the voltage V2 is applied to a horizontal scan control line 440, the transistors 258b become conductive.

The horizontal drive circuit 410A includes a cathode voltage control circuit 414 for supplying voltage to a cathode voltage control line 705 connected to the transistors 258b of the respective unit areas 256. When the transistors 258a and 258b in a unit area 256 are made conductive, a voltage is applied from the cathode voltage control circuit 414 through the cathode voltage control line 705 to the unit-area-specific cathode electrodes 252A and cathodes 253. The gate electrode 255A receives a voltage applied by the gate-voltage control circuit 424 of the vertical drive circuit 420A.

When both of the transistors 258a and 258b are turned on in a unit area 256 of the electron emission array 250A, the cathodes 253 of this unit area 256 emit electrons. The amount of electrons is responsive to the voltage applied from the gate-voltage control circuit 424 to the gate electrode 255A and the voltage applied from the cathode-voltage control circuit 414 to the cathodes 253.

The vertical address circuit 421A of the vertical drive circuit 420A uses electron-emission-array control signals based on the amplitude of an output video signal as supplied from the control circuit 500A, for example, to select a vertical scan control line 430 for application of the voltage V2 in the horizontal blanking period Thb.

Moreover, the vertical address circuit 421A uses the electron-emission-array control signals based on the amplitude of an output video signal as supplied from the control circuit 500A, for example, to control the number of horizontal blanking periods Thb for application of the voltage V2 to a vertical scan control line 430 and the duration and number of pulses of the voltage V2 applied to a vertical scan control line 430 in a horizontal blanking period Thb.

The horizontal address circuit 411A of the horizontal drive circuit 410A uses the electron-emission-array control signals based on the amplitude of an output video signal as supplied from the control circuit 500A, for example, to select a horizontal scan control line 440 to which the voltage V2 is applied in a horizontal blanking period Thb.

The configuration shown in FIG. 21 is directed to a case in which the transistors 258a are controlled to perform a scan in the vertical direction, and the transistors 258b are controlled to perform a scan in the horizontal direction. Alternatively, provision may be made such that a scan in the vertical direction is performed by controlling the transistors 258b, and a scan in the horizontal direction is performed by controlling the transistors 258a.

Figure 22B:
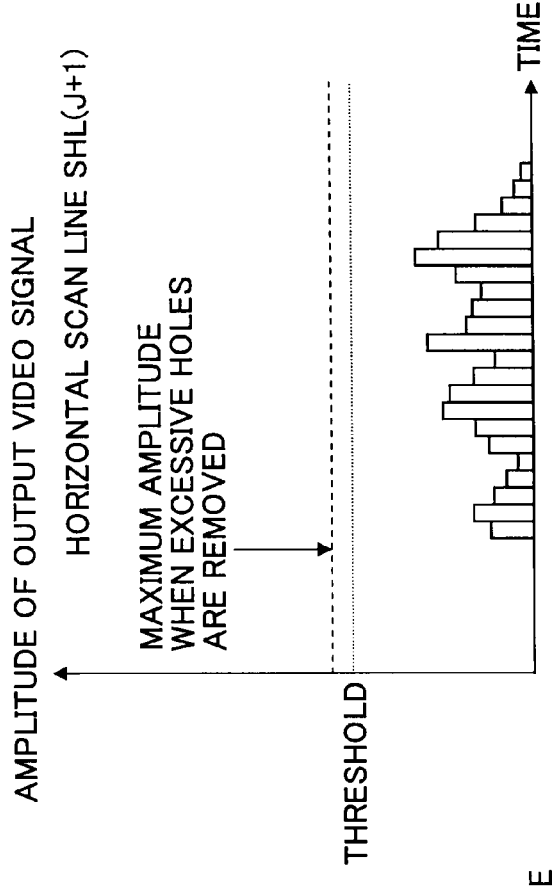
FIGS. 22A and 22B are drawings showing the amplitude of an output video signal obtained by reading holes accumulated in a photoelectric conversion film at the position opposite to unit areas by use of electrons emitted from the cathodes of these unit areas corresponding to two horizontal scan lines between which video signal output timings are different in the imaging apparatus of the second embodiment.
Figure 22A:
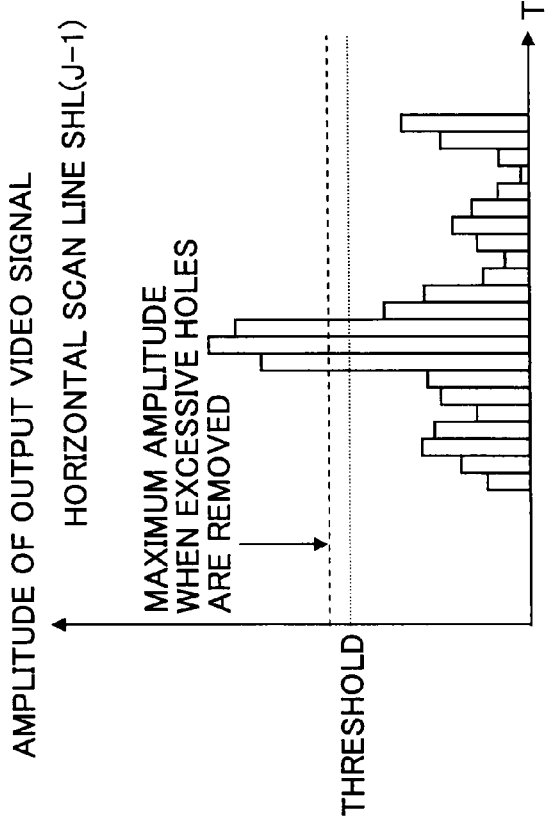

FIGS. 22A and 22B are drawings showing the amplitude of an output video signal obtained by reading holes accumulated in the photoelectric conversion film 230 at the position opposite to unit areas 256 by use of electrons emitted from the cathodes 253 of these unit areas 256 corresponding to two horizontal scan lines SHL(J−1) and SHL(J+1) between which video signal output timings are different.

In FIGS. 22A and 22B, the larger the amplitude of an output video signal, the higher the intensity of light (i.e., magnitude of light) incident to the corresponding portion of the photoelectric conversion film 230 is.

A threshold value is selected for the amplitude of an output video signal such that the selected threshold value is smaller than the maximum amplitude of the output video signal readable by electrons emitted from the cathodes 253 of each unit area 256 during the video signal output period Th.

As shown in FIG. 22A, the amplitude of an output video signal obtained from the horizontal scan line SHL(J−1) may exceed the threshold value. Provision is then made such that the amplitude exceeding the threshold value triggers the cathodes 253 of each unit area 256 included in the horizontal scan line SHL(J−1) to emit electrons in the horizontal blanking period Thb, thereby to remove excess holes accumulated in the opposite photoelectric conversion film 230.

On the other hand, if the amplitude of an output video signal obtained from the horizontal scan line SHL(J+1) is below the threshold value, the cathodes 253 of each unit area 256 included in the horizontal scan line SHL(J+1) do not emit electrons in the horizontal blanking period Thb.

Such threshold-based control is performed to efficiently remove excessive holes accumulated in the photoelectric conversion film 230 only at the position where highly bright light enters. This serves to prevent the creation of residual images and the degradation of image resolution while reducing the load on the electron emission array 250A.

Figure 23:
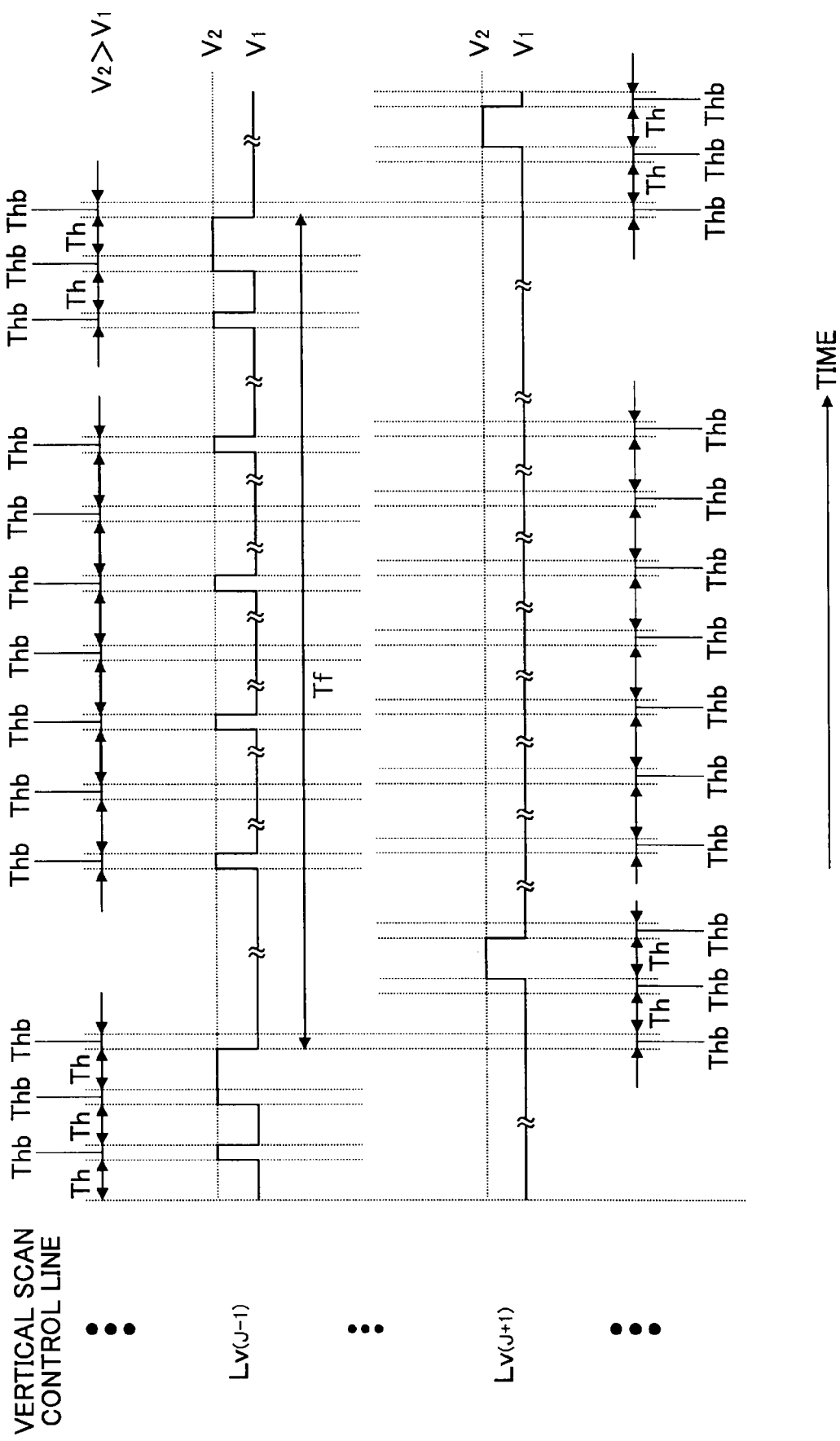
FIG. 23 is a drawing showing the amplitude and timing of pulse voltages applied to the vertical scan control lines Lv in the imaging apparatus of the second embodiment.

FIG. 23 is a drawing showing the amplitude and timing of pulse voltages applied to the vertical scan control lines Lv in order to achieve the above-described driving method.

Figure 24:
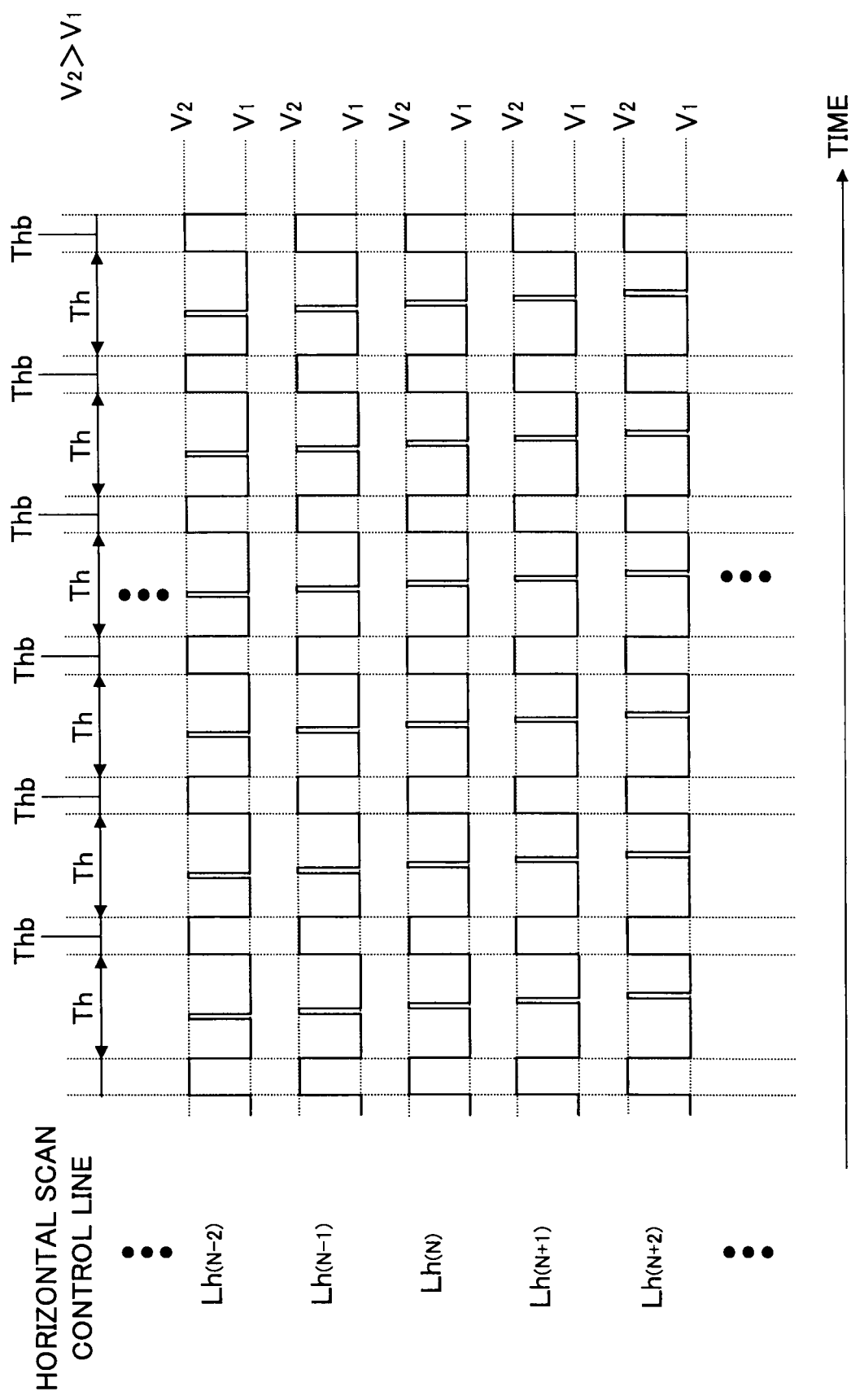
FIG. 24 is a drawing showing the amplitude and timing of pulse voltages applied to the horizontal scan control lines Lh in the imaging apparatus of the second embodiment.

FIG. 24 is a drawing showing the amplitude and timing of pulse voltages applied to the horizontal scan control lines Lh in order to achieve the above-described driving method.

Figure 25:
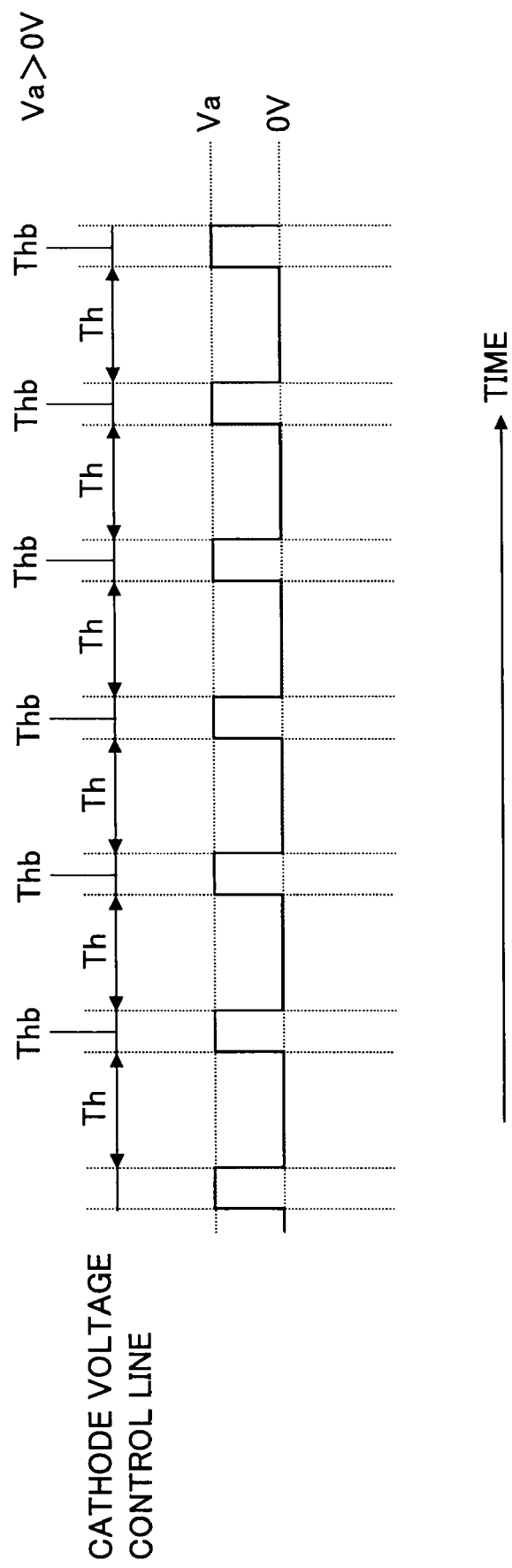
FIG. 25 is a drawing showing the amplitude and timing of pulse voltages applied to the cathode voltage control line in the imaging apparatus of the second embodiment.

FIG. 25 is a drawing showing the amplitude and timing of pulse voltages applied to the cathode voltage control line 705.

Figure 26:
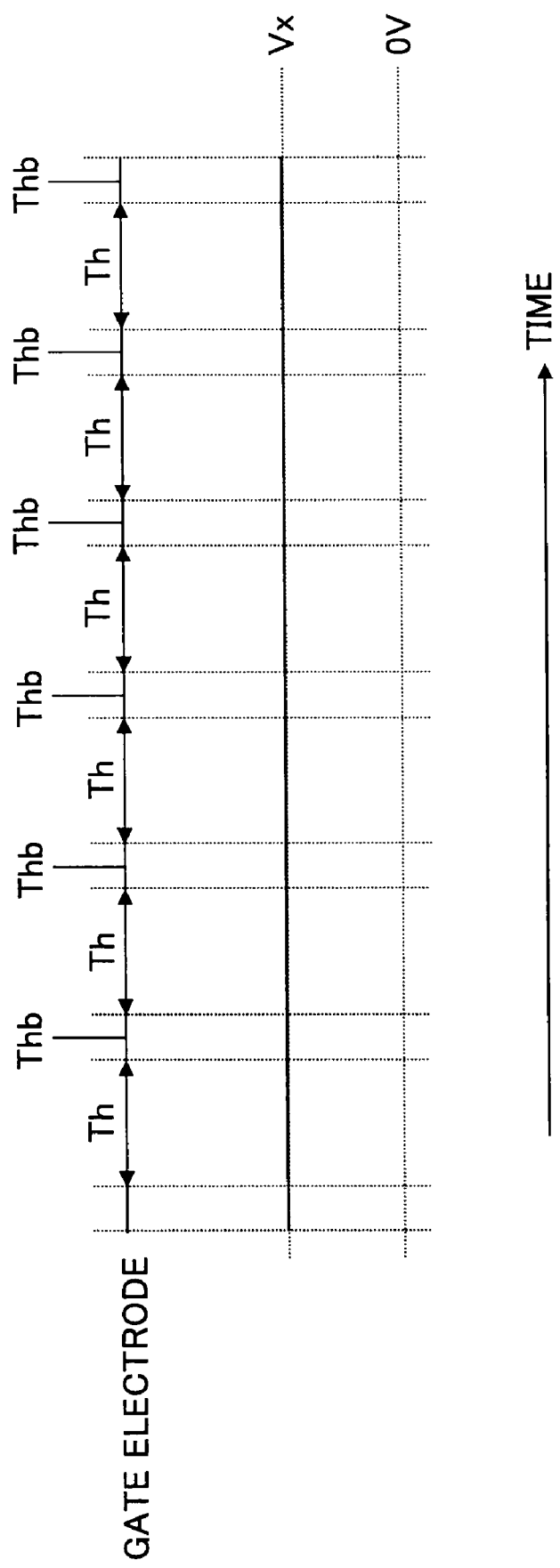
FIG. 26 is a drawing showing the amplitude and timing of pulse voltages applied to the gate electrode in the imaging apparatus of the second embodiment.

FIG. 26 is a drawing showing the amplitude and timing of voltages applied to the gate electrodes 255.

With the voltage pulses and voltages shown in FIG. 23, FIG. 24, FIG. 25, and FIG. 26 being applied, the voltage V2 is applied to the vertical scan control lines Lv in the video signal output periods Th, and the voltage V2 is applied to the horizontal scan control lines Lh. With these arrangements, the transistors 258a and 258b situated in the unit area 256 at the intersection between the activated vertical scan control line Lv and the activated horizontal scan control line Lh are made conductive. The cathodes 253 in this unit area 256 receive voltage 0 V. Electrons are emitted from these cathodes 253 of the unit area 256 in response to a potential difference between the potential of the cathodes 253 and the voltage Vx applied to the gate electrode 255A, thereby producing a video signal.

In horizontal blanking periods Thb, the voltage V2 is applied to a vertical scan control line Lv(J−1) connected to the unit areas 256 included in the horizontal scan line SHL(J−1) in which the amplitude of an output video signal exceeds the threshold, and the voltage V2 is applied to all the horizontal scan control lines Lh. Accordingly, the transistors 258a and 258b included in the unit areas 256 belonging to the horizontal scan line SHL(J−1) are turned on.

As a result, the voltage Va is applied to the cathodes 253 of the unit areas 256 belonging to the horizontal scan line SHL(J−1). The cathodes 253 of each unit area 256 belonging to the horizontal scan line SHL(J−1), i.e., each element belonging to the horizontal scan line SHL(J−1), emit electrons in response to a potential difference between the voltage Va and the voltage Vx applied to the gate electrode 255A.

On the horizontal scan line SHL(J+1) in which the amplitude of an output video signal is below the threshold, as shown in FIG. 23, the voltage V2 is not applied to a vertical scan control line Lv(J+1) connected to the unit areas 256 belonging to the horizontal scan line SHL(J+1) in any horizontal blanking period Thb. Accordingly, the cathodes 253 of the unit areas 256 belonging to the vertical scan control line Lv(J+1) dot not emit electrons.

In the above-described drive method, Va or the threshold value is selected such that the maximum amplitude of an output video signal exceeds the threshold value when excessive holes accumulated in the photoelectric conversion film 230 are to be removed.

The above-described drive method has been directed to an example in which the voltage Va is applied to the cathode voltage control line 705 in each horizontal blanking period Thb as shown in FIG. 25 to remove only excessive holes generated and accumulated in the photoelectric conversion film 230. Alternatively, voltage 0 V may be applied to the cathode voltage control line 705 in each horizontal blanking period Thb, and the power supply 611 shown in FIG. 19 is controlled such that a voltage lower than the voltage applied to the photoelectric conversion film 230 during the video signal output period Th is applied to the photoelectric conversion film 230 in each horizontal blanking period Thb.

Figure 27:
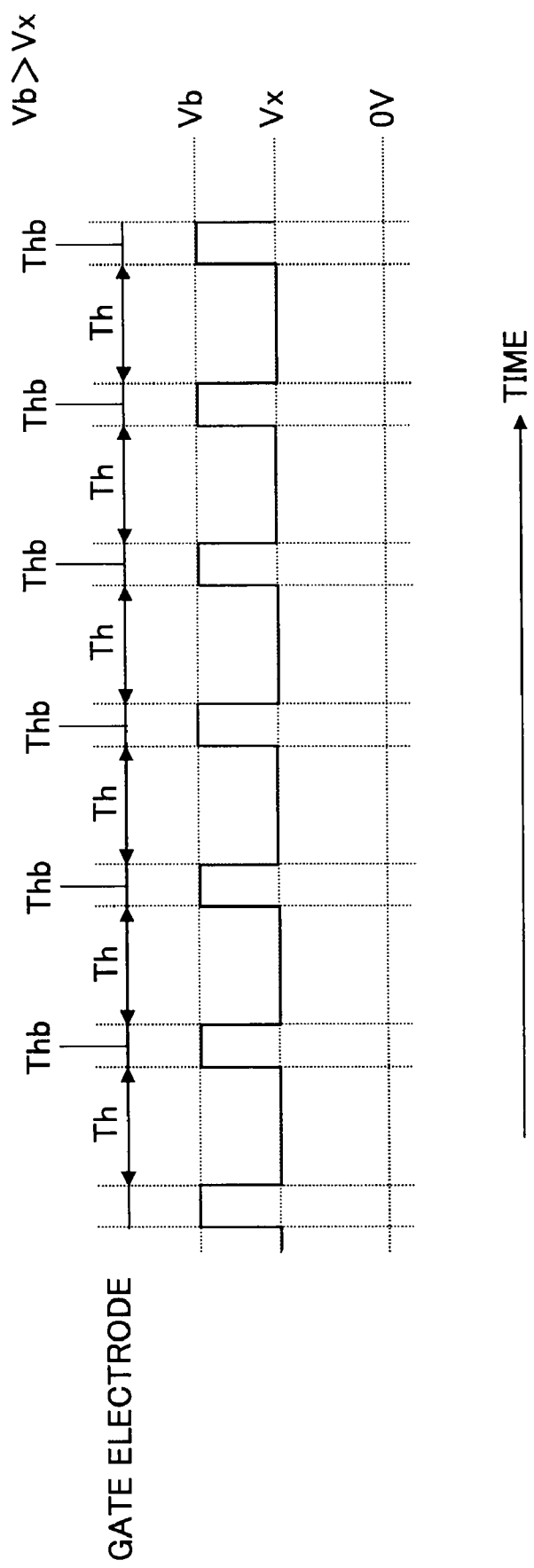
FIG. 27 is a drawing showing the amplitude and timing of other pulse voltages applied to the gate electrode of the imaging apparatus of the second embodiment.

Alternatively, as shown in FIG. 27, the voltage Vb applied to the gate electrode 255A in the horizontal blanking period Thb may be set higher than the voltage Vx applied to the gate electrode 255A in the video signal output period Th, thereby increasing the amount of electrons emitted during the horizontal blanking period Thb.

It should be noted that, in the above-described operation, electrons emitted in the horizontal blanking period Thb in response to an output video signal are used to remove excess holes accumulated in the photoelectric conversion film 230. There is thus a delay in control. When a highly bright luminous object in motion is filmed, for example, there is a risk of suffering the occurrence of residual images and the degradation of image resolution.

Figure 28:
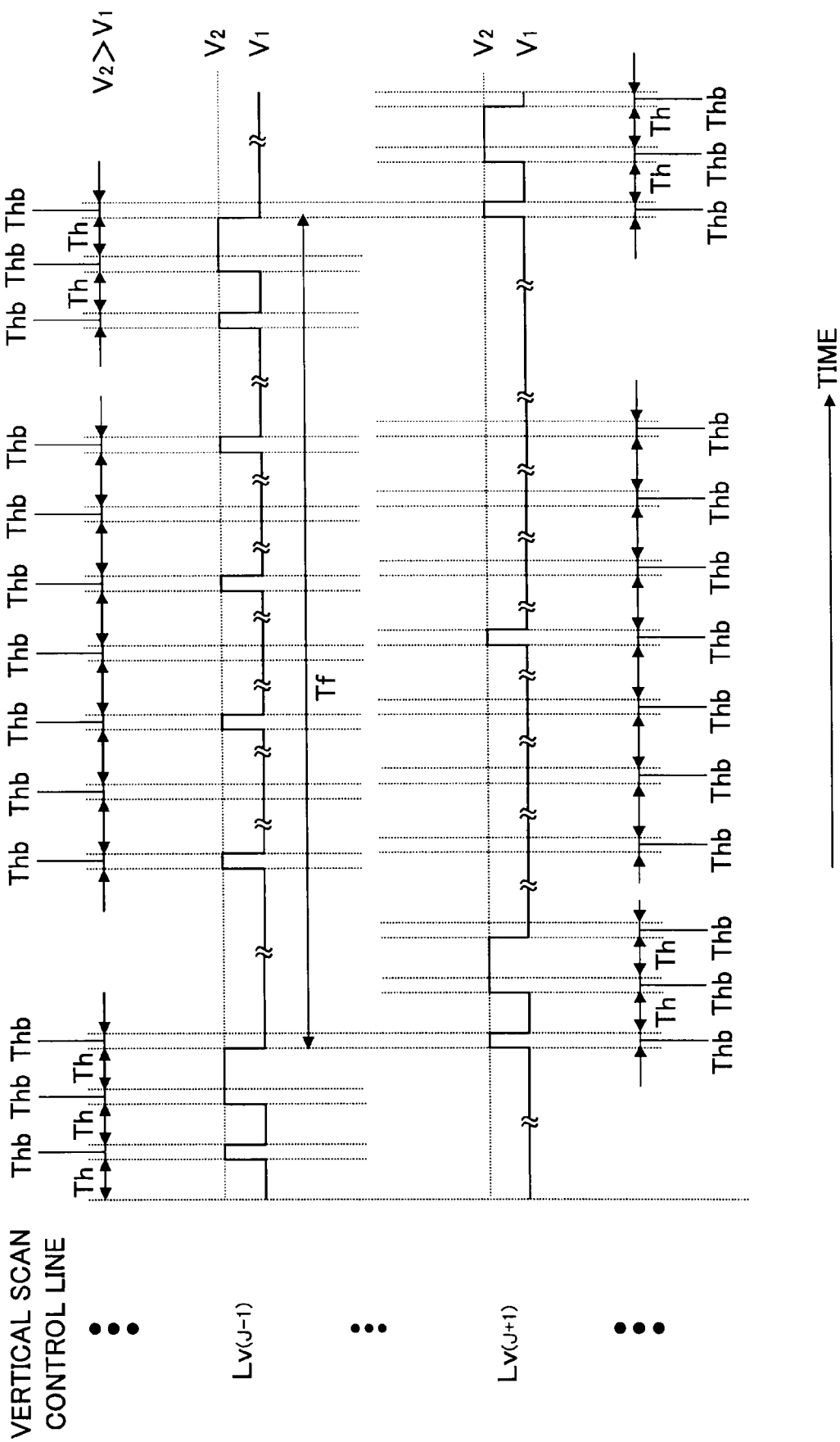
FIG. 28 is a drawing showing the amplitude and timing of other pulse voltages applied to the vertical scan control lines Lv of the imaging apparatus of the second embodiment.

In consideration of this, the voltage V2 is also applied as shown in FIG. 28 to the vertical scan control line Lv(J+1) corresponding to the horizontal scan line SHL(J+1) in which the amplitude of an output video signal is lower than the threshold value. The application of the voltage V2 is performed in fewer horizontal blanking periods Thb than all the horizontal blanking periods Thb during which the voltage V2 is applied to the vertical scan control line Lv(J−1) for which the amplitude of an output video signal exceeds the threshold value. In this manner, electrons are emitted further from each element belonging to the horizontal scan line SHL(J+1) for which the amplitude of an output video signal is lower than the threshold value.

This arrangement makes it possible to cope with a delay in control using an output video signal. The occurrence of residual images and the degradation of image resolution are thus prevented despite the existence of highly bright incident light while reducing the load on the electron emission array 250A.

The configuration shown in FIG. 28 is directed to an example in which, with respect to the horizontal scan line SHL(J+1) having the amplitude of its output video signal lower than the threshold, the voltage V2 is applied to the vertical scan control line Lv(J+1) corresponding to the horizontal scan line SHL(J+1) in a fewer number of horizontal blanking periods Thb. Alternatively, as shown in FIG. 29, the duration of the voltage V2 applied to the vertical scan control line Lv(J+1) in a horizontal blanking period Thb may be shortened.

Alternatively, as shown in FIG. 30, the voltage V2 is applied intermittently as pulses in a horizontal blanking period Thb. With this arrangement, the number of pulses applied to the vertical scan control line Lv(J+1) in a single horizontal blanking period Thb may be reduced. The duration of the applied voltage V2 may as well be shortened.

Figure 29:
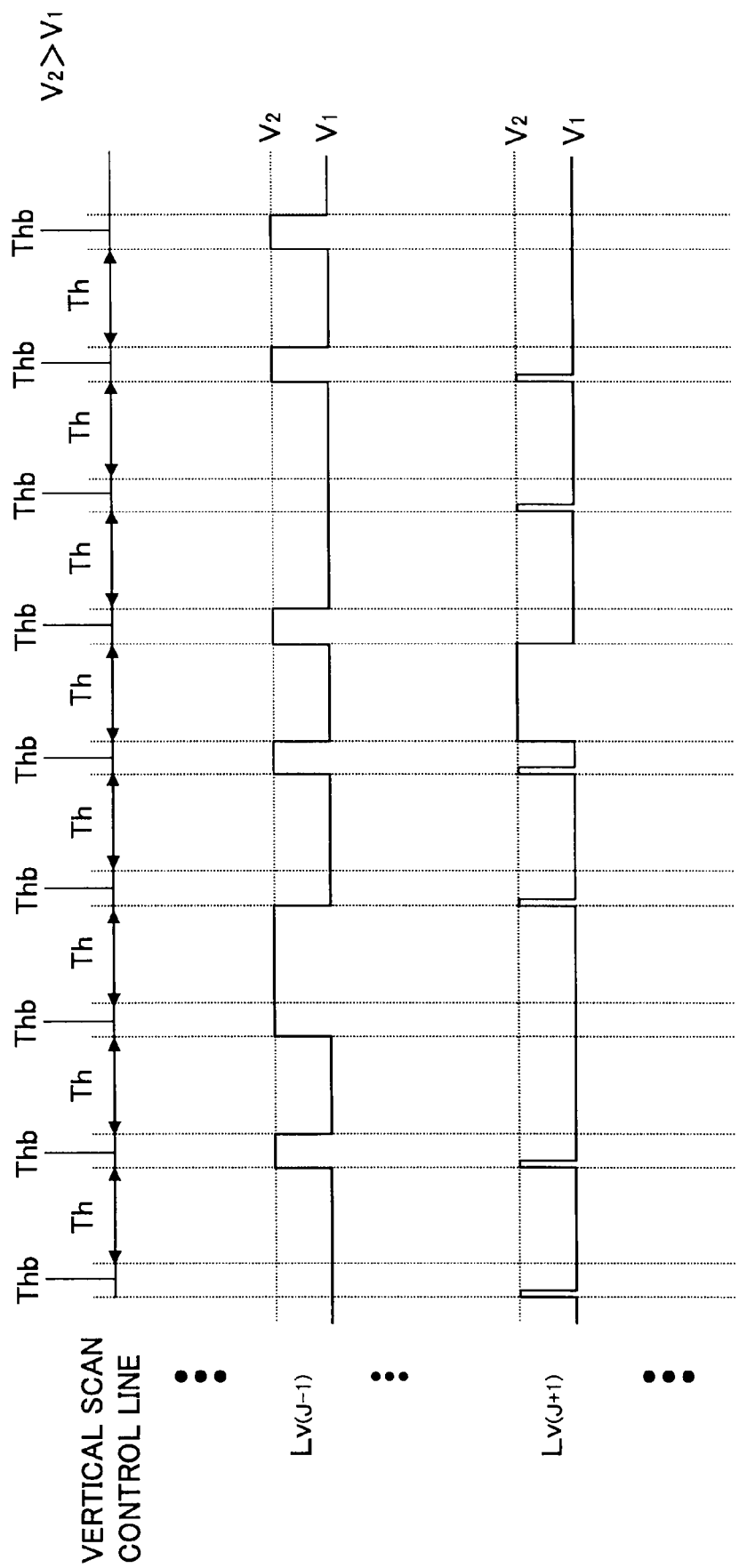
FIG. 29 is a drawing showing the amplitude and timing of other pulse voltages applied to the vertical scan control lines Lv of the imaging apparatus of the second embodiment.

Similarly to the manner in which the drive method of FIG. 28 operates, the drive methods shown in FIG. 29 and FIG. 30 make it possible to cope with a delay in control using an output video signal. The occurrence of residual images and the degradation of image resolution are thus prevented despite the existence of highly bright incident light while reducing the load on the electron emission array 250A.

The electron emission array 250 described in connection with the first embodiment or a drive-circuit-embedded passive emitter array may be used in place of the electron emission array 250A. In such a case, the gate electrodes 255 are separated through insulation for each horizontal scan line 257. Even when the elements belonging to different horizontal scan lines 257 emit electrons in the same number of horizontal blanking periods Thb for the same emission duration with respect to each horizontal blanking period Thb in one field or frame period, the voltage applied to the gate electrode 255 in a horizontal blanking period Thb is set relatively high with respect to the horizontal scan line 257 for which the amplitude of an output video signal exceeds the threshold. Also, the voltage applied to the gate electrode 255 in a horizontal blanking period Thb is set relatively low with respect to the horizontal scan line 257 for which the amplitude of an output video signal is below the threshold. With this arrangement, the amount of electrons emitted from each element belonging to a horizontal scan line 257 of interest in a horizontal blanking period Thb is controlled in response to the amplitude of an output video signal.

This arrangement makes it possible to cope with a delay in control using an output video signal. The occurrence of residual images and the degradation of image resolution are thus prevented despite the existence of highly bright incident light while reducing the load on the electron emission array 250A.

Figure 31A:
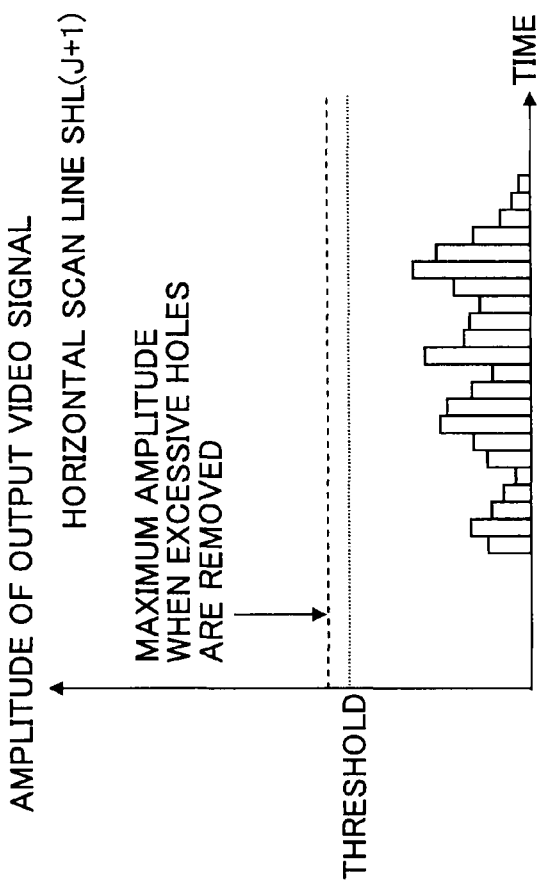
FIGS. 31A and 31B are drawings showing the amplitude of an output video signal as appears after the removal of excessive holes accumulated in the photoelectric conversion film using the amplitude of an output video signal shown in FIGS. 22A and 22B.
Figure 31B:
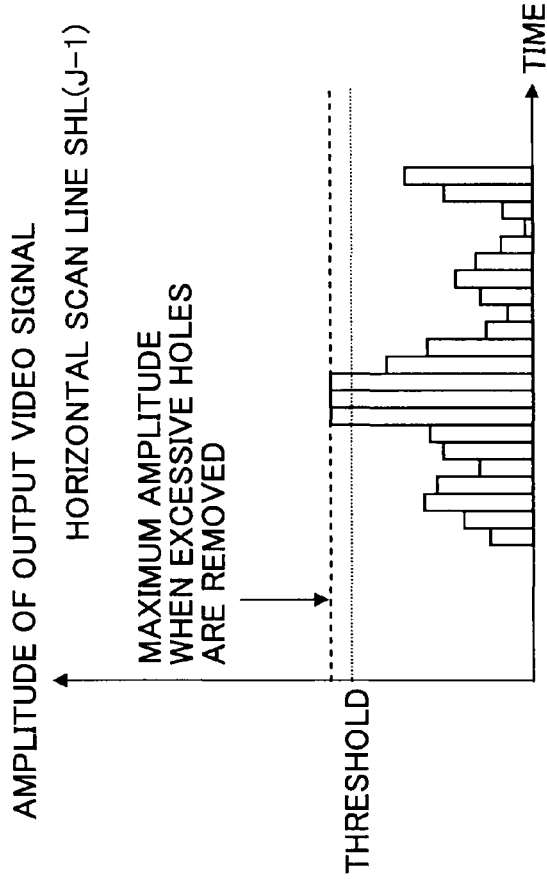

FIGS. 31A and 31B are drawings showing the amplitude of an output video signal as appears after the removal of excessive holes accumulated in the photoelectric conversion film 230 by use of the drive method of the second embodiment using the amplitude of an output video signal shown in FIGS. 22A and 22B.

Excessive holes are removed from the photoelectric conversion film 230 at the position corresponding to the unit areas 256 for which the amplitude of an output video signal exceeds the threshold value. As shown in FIG. 31A, thus, the amplitudes of the output video signals obtained from such unit areas 256 are lowered to a level determined by the voltage Va applied to the cathodes 253 of the unit areas 256 in the horizontal blanking period Thb.

However, the amplitude of an output video signal responsive to the voltage Va applied to the cathodes 253 is higher than the threshold. Electrons thus continue to be emitted in the horizontal blanking period Thb. The above-described operation continues until the amplitudes of the output video signals are lowered below the threshold value in response to a decrease in the amount of incident light as shown in FIG. 31B, for example.

Figure 32:
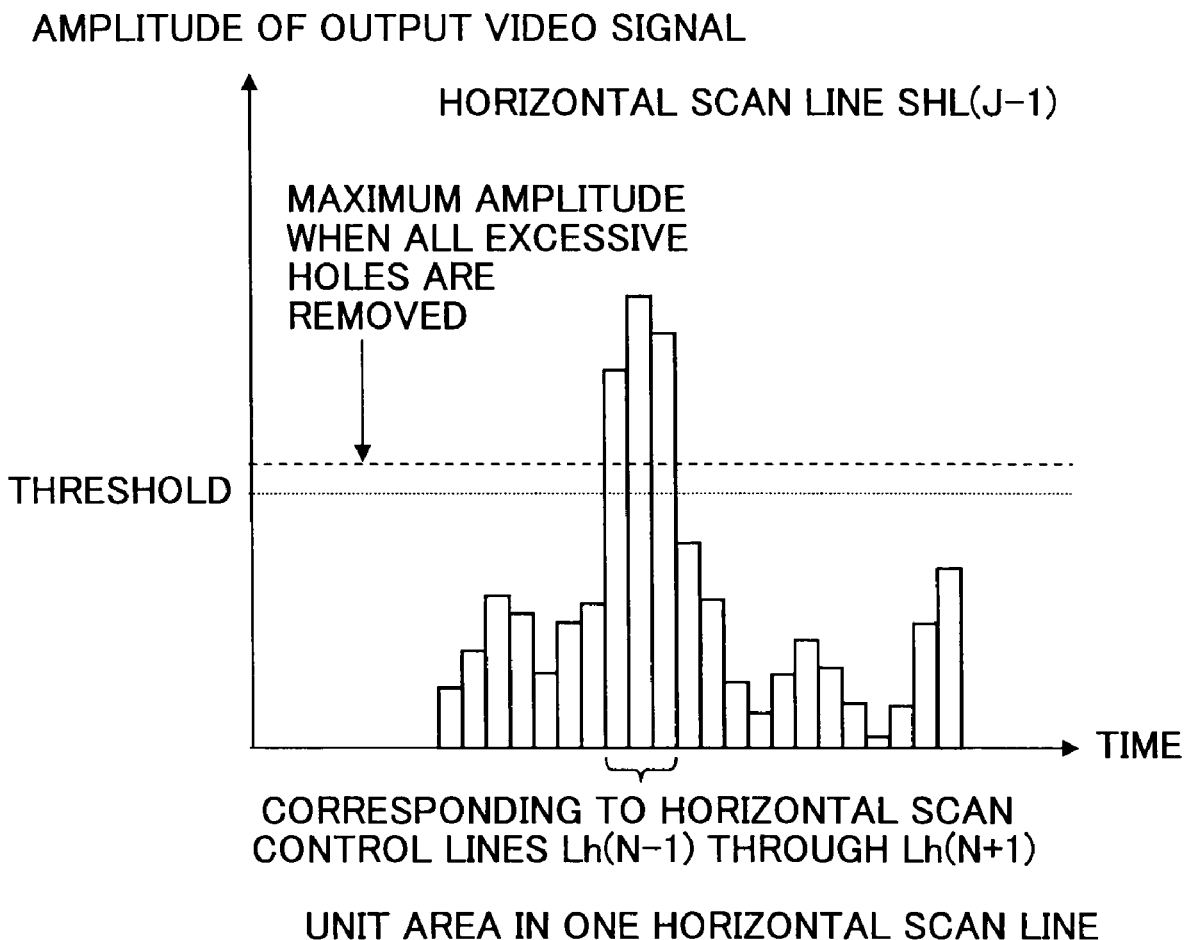
FIG. 32 is a drawing showing the amplitude of an output video signal obtained by reading holes accumulated in a photoelectric conversion film at the position opposite to unit areas by use of electrons emitted from the cathodes of these unit areas belonging to a horizontal scan line in the imaging apparatus of the second embodiment.

FIG. 32 is a drawing showing the amplitude of an output video signal obtained by reading holes accumulated in the photoelectric conversion film 230 at the position opposite to unit areas 256 by use of electrons successively emitted from the cathodes 253 of these unit areas 256 belonging to the horizontal scan line SHL(J−1).

In FIG. 32, the amplitude of an output video signal exceeds the threshold value with respect to some unit areas 256 (connected to the horizontal scan control lines Lh(N−1) through Lh(N+1)) among the unit areas 256 belonging to the horizontal scan line SHL(J−1).

Only the unit areas 256 for which the amplitude of an output video signal exceeds the threshold value emit electrons in a horizontal blanking period Thb to remove excessive holes accumulated in the photoelectric conversion film 230 at the position opposite to these unit areas. This serves to further reduce the load on the electron emission array while preventing the degradation of image resolution and the occurrence of residual images.

Figure 33:
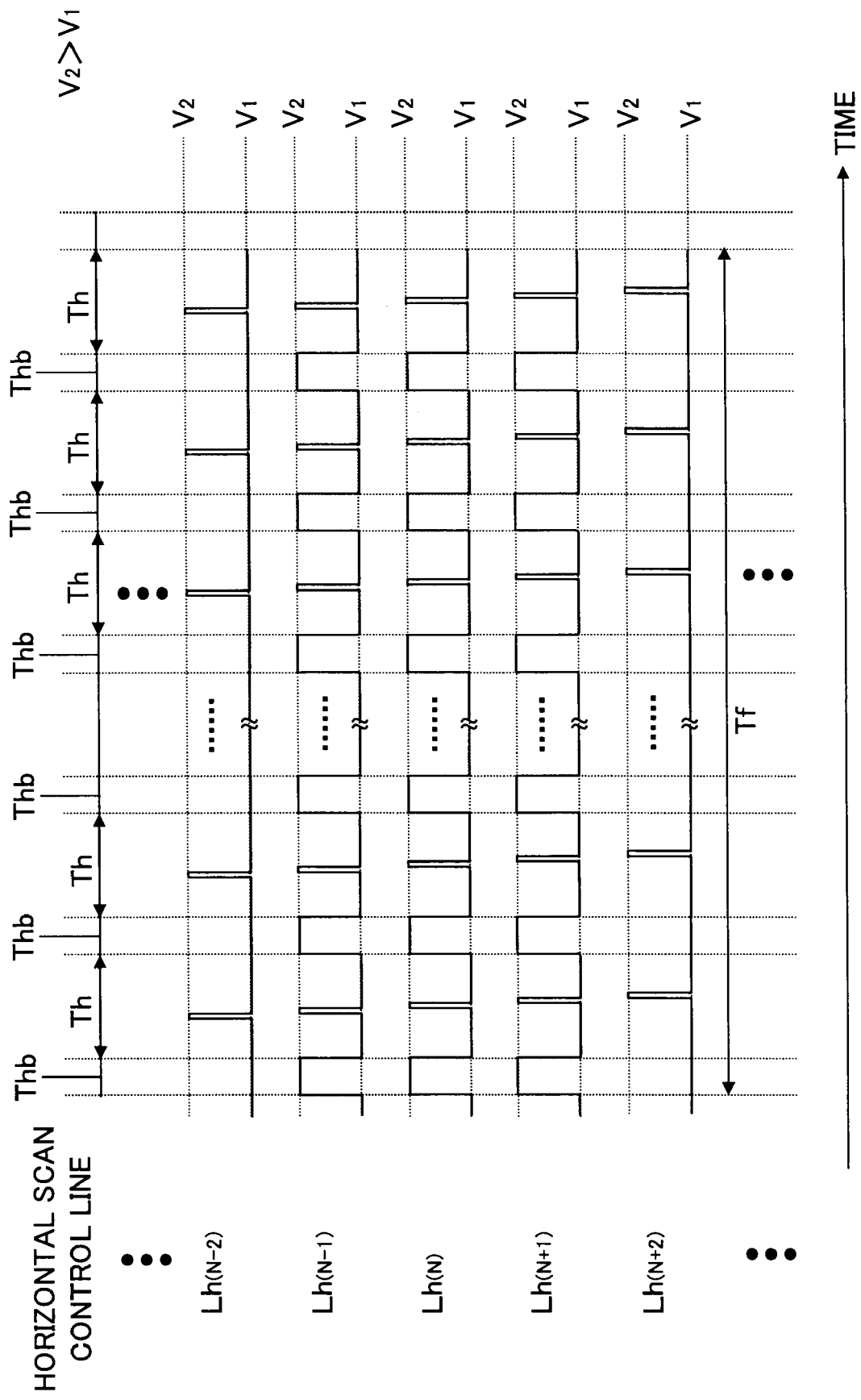
FIG. 33 is a drawing showing the amplitude and timing of other pulse voltages applied to the horizontal scan control lines Lh of the imaging apparatus of the second embodiment.

FIG. 33 is a drawing showing the amplitude and timing of pulse voltages applied to the horizontal scan control lines Lh in order to achieve the above-described driving method.

Figure 34:
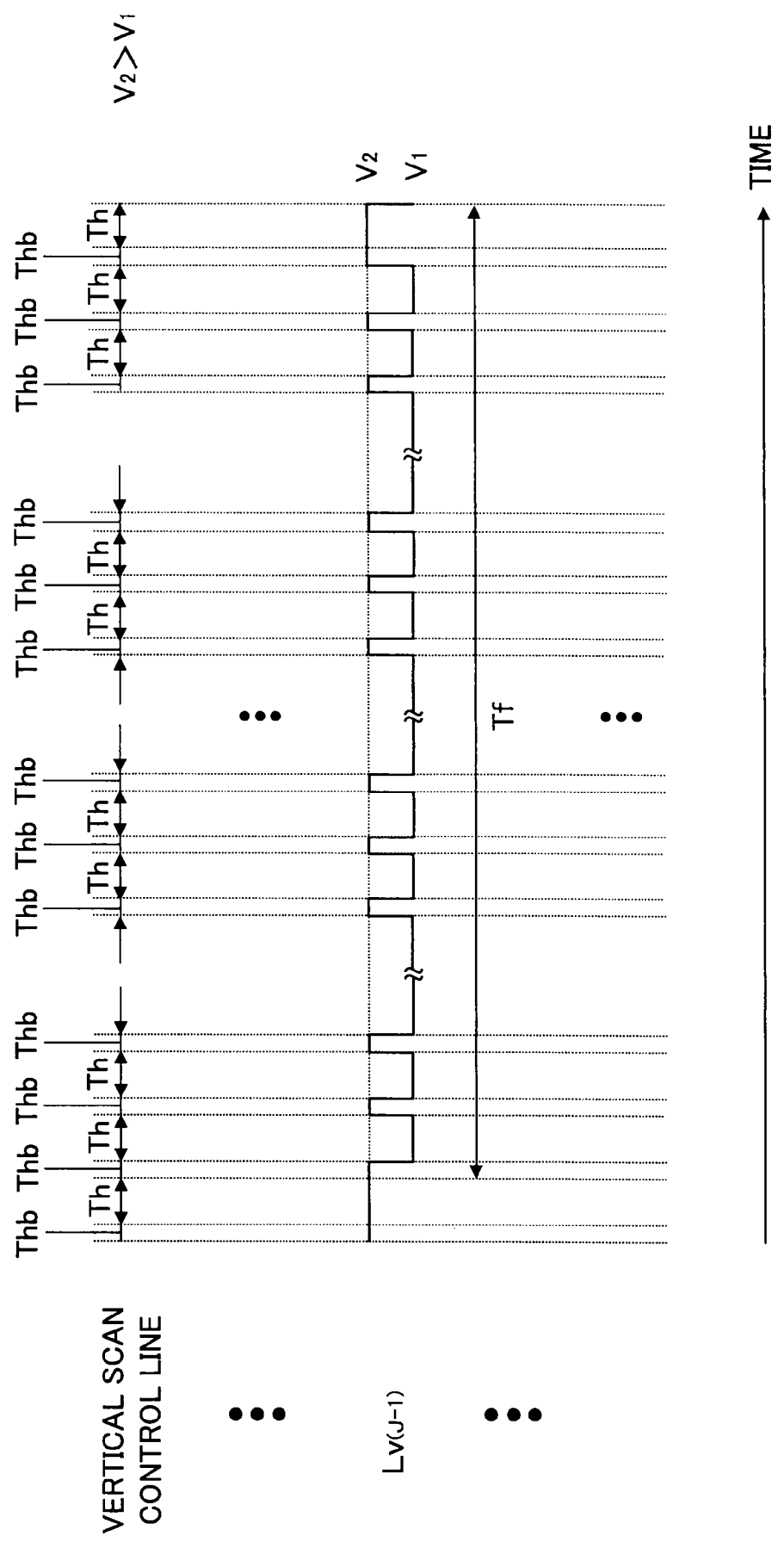
FIG. 34 is a drawing showing the amplitude and timing of other pulse voltages applied to the vertical scan control lines Lv of the imaging apparatus of the second embodiment.

FIG. 34 is a drawing showing the amplitude and timing of pulse voltages applied to the vertical scan control line Lv(J−1) corresponding to the horizontal scan line SHL(J−1) in order to implement the above-described driving method.

As shown in FIG. 33, the voltage V2 is applied in each horizontal blanking period Thb to the horizontal scan control lines Lh(N−1) through Lh(N+1) connected to unit areas 256 for which the amplitude of an output video signal exceeds the threshold. The voltage V1 is applied to the remaining horizontal scan control lines. At the same time, the vertical scan control line Lv(J−1) receives the voltage V2 in each horizontal blanking period Thb as shown in FIG. 34.

Electrons are thus emitted in each horizontal blanking period Thb only from the elements for which the amplitude of an output video signal exceeds the threshold, thereby removing excessive holes from the photoelectric conversion film 230 at the opposite position.

In the above descriptions of the imaging apparatus of the first and second embodiments, no mention has been made of a vertical blanking period. A portion of the vertical blanking period may be regarded as a horizontal blanking period to perform the same operations to achieve the same advantages.

The descriptions of the imaging apparatus of exemplary embodiments have been provided heretofore. The present invention is not limited to these embodiments, but various variations and modifications may be made without departing from the scope of the present invention.

The present application is based on Japanese priority application No. 2007-134789 filed on May 21, 2007, with the Japanese Patent Office, the entire contents of which are hereby incorporated by reference.

What is claimed is:

1. An imaging apparatus, comprising:
an electron emission array having electron sources arranged in matrix form and having a plurality of horizontal scan lines;
a photoelectric conversion film opposed to the electron emission array; and
a control and drive circuit configured to select one or more of the horizontal scan lines in a given video signal output period, wherein
the electron sources included in the selected one or more horizontal scan lines emit electrons toward the photoelectric conversion film to produce a video signal, and
the electron sources included in unselected one or more horizontal scan lines not selected in the given video signal output period emit electrons toward the photoelectric conversion film in a blanking period immediately preceding the given video signal output period.

2. The imaging apparatus as claimed in claim 1, wherein the electron sources included in the selected one or more horizontal scan lines selected in the given video signal output period emit electrons toward the photoelectric conversion film in the blanking period immediately preceding the given video signal output period.

3. The imaging apparatus as claimed in claim 1, wherein the electron sources included in the selected one or more horizontal scan lines emit electrons toward the photoelectric conversion film in a plurality of blanking periods situated between the given video signal output period and a next video signal output period in which the one or more horizontal scan lines will be selected next time.

4. The imaging apparatus as claimed in claim 1, wherein the electron sources included in the selected one or more horizontal scan lines emit electrons toward the photoelectric conversion film in each or some of a plurality of blanking periods situated between the given video signal output period and a next video signal output period in which the one or more horizontal scan lines will be selected next time, said some of the plurality of blanking periods being blanking periods spaced apart by one or more intervening, consecutive blanking periods.

5. The imaging apparatus as claimed in claim 1, wherein two or more blanking periods during which electrons are emitted from the electron sources included in the selected one or more horizontal scan lines selected in the given video signal output period are identical to two or more blanking periods during which electrons are emitted from the electron sources included in one or more horizontal scan lines selected in another video signal output period.

6. The imaging apparatus as claimed in claim 1, wherein at least one blanking period during which electrons are emitted from the electron sources included in the selected one or more horizontal scan lines selected in the given video signal output period differs from any blanking period during which electrons are emitted from the electron sources included in one or more horizontal scan lines selected in another video signal output period.

7. The imaging apparatus as claimed in claim 1, wherein the electron emission array includes a first electrode for emitting electrons and a second electrode for creating a potential gap with the first electrode, and a potential gap is created between the first electrode and the second electrode to draw out electrons from the first electrode.

8. The imaging apparatus as claimed in claim 7, wherein a potential gap created between the first electrode and the second electrode in the blanking period is set larger than a potential gap created between the first electrode and the second electrode in the given video signal output period.

9. The imaging apparatus as claimed in claim 7, wherein at least one of the first electrode and the second electrode receives a first voltage in the blanking period, and receives a second voltage different from the first voltage in the given video signal output period.

10. The imaging apparatus as claimed in claim 1, wherein the photoelectric conversion film receives a first voltage in the blanking period, and receives a second voltage different from the first voltage in the given video signal output period.

11. The imaging apparatus as claimed in claim 1, further comprising a signal level detecting unit configured to detect a signal level of a video signal output from a horizontal scan line in a video signal output period, wherein either a horizontal scan line including the electron sources to emit electrons towards the photoelectric conversion film in a given blanking period or the electron sources included in a horizontal scan line to emit electrons towards the photoelectric conversion film in a given blanking period is selected in response to the signal level of the video signal detected by the signal level detecting unit.

12. The imaging apparatus as claimed in claim 1, further comprising a signal level detecting unit configured to detect a signal level of a video signal output from a horizontal scan line in a video signal output period, wherein a number of blanking periods during which the electron sources included in a given horizontal scan line emit electrons towards the photoelectric conversion film varies depending on the signal level of the video signal detected by the signal level detecting unit with respect to the given horizontal scan line.

13. The imaging apparatus as claimed in claim 1, further comprising a signal level detecting unit configured to detect a signal level of a video signal output from a horizontal scan line in a video signal output period, wherein a time length during which electrons are emitted from the electron sources included in a given horizontal scan line toward the photoelectric conversion film in a given blanking period varies depending on the signal level of the video signal detected by the signal level detecting unit with respect to the given horizontal scan line.

14. The imaging apparatus as claimed in claim 7, further comprising a signal level detecting unit configured to detect a signal level of a video signal output from a horizontal scan line in a video signal output period, wherein a potential gap created between the first electrode and the second electrode in the electron sources included in a given horizontal scan line to emit electrons in a given blanking period varies depending on the signal level of the video signal detected by the signal level detecting unit with respect to the given horizontal scan line.

* * * * *